US012673337B2

(12) United States Patent
Seitz et al.

(10) Patent No.: US 12,673,337 B2
(45) Date of Patent: Jul. 7, 2026

(54) MEASURING DEVICE FOR MEASURING A COATING POWDER MASS FLOW RATE THAT CAN BE GENERATED BY MEANS OF COMPRESSED GAS IN A POWDER LINE AND CONVEYING DEVICE FOR COATING POWDER

(71) Applicant: J. Wagner GmbH, Markdorf (DE)

(72) Inventors: Kurt Seitz, Widnau (CH); Kevin Luzi, Hinterforst (CH); Michael Topp, Oberteuringen (DE); René Schmid, Hinterforst (CH)

(73) Assignee: J. Wagner GmbH, Markdorf (DE)

( * ) Notice: Subject to any disclaimer, the term of this patent is extended or adjusted under 35 U.S.C. 154(b) by 281 days.

(21) Appl. No.: 18/683,015

(22) PCT Filed: Aug. 12, 2022

(86) PCT No.: PCT/EP2022/072631
§ 371 (c)(1),
(2) Date: Feb. 12, 2024

(87) PCT Pub. No.: WO2023/030863
PCT Pub. Date: Mar. 9, 2023

(65) Prior Publication Data
US 2024/0351057 A1     Oct. 24, 2024

(30) Foreign Application Priority Data
Aug. 31, 2021     (EP) ..................................... 21193945

(51) Int. Cl.
B05B 12/00          (2018.01)
B05B 7/14           (2006.01)
(Continued)

(52) U.S. Cl.
CPC .......... B05B 12/006 (2013.01); B05B 7/1472 (2013.01); G01F 1/76 (2013.01);
(Continued)

(58) Field of Classification Search
CPC ..... B05B 12/006; B05B 7/1472; B05B 15/55; G01F 1/76; G01F 1/34; G01F 1/74
See application file for complete search history.

(56) References Cited

U.S. PATENT DOCUMENTS 5,351,520 A * 10/1994 Buquet ................. B05B 7/1404
                                                 73/861.04
5,454,271 A * 10/1995 Yamamoto .............. B05B 12/08
                                                 73/32 R
(Continued)

FOREIGN PATENT DOCUMENTS

DE        102 47 829 A1     4/2004
DE        103 00 280 A1     7/2004
(Continued)

OTHER PUBLICATIONS

International Search Report for corresponding Application No. PCT/EP2022/072631, mailed Nov. 14, 2022.
(Continued)

*Primary Examiner* — Jonathan M Dunlap
(74) *Attorney, Agent, or Firm* — Renner, Otto, Boisselle & Sklar, LLP

(57)          ABSTRACT
A measuring apparatus for measuring a coating powder mass flow rate generable by compressed gas in a powder line includes a control and evaluation unit, which is configured and operable such that it can switch between an offset mode and an operating mode. In the offset mode, the control and evaluation unit ensures that a setting device applies compressed gas to the powder line and prevents the coating powder flow in the powder line, and that a pressure sensor
(Continued)

then detects the pressure in the powder line. The control and evaluation unit interprets the detected pressure as an offset pressure value. In the operating mode, the control and evaluation unit ensures that the setting device enables the coating powder flow in the powder line, and then determines the coating powder mass flow rate flowing through the powder line on the basis of the pressure detected by the pressure sensor in the powder line, the offset pressure value and a correction value.

20 Claims, 13 Drawing Sheets

(51) Int. Cl.
| | |
|---|---|
| *B05B 15/55* | (2018.01) |
| *G01F 1/34* | (2006.01) |
| *G01F 1/74* | (2006.01) |
| *G01F 1/76* | (2006.01) |

(52) U.S. Cl.
CPC ............... *B05B 15/55* (2018.02); *G01F 1/34* (2013.01); *G01F 1/74* (2013.01)

(56) References Cited

U.S. PATENT DOCUMENTS

| | | | | |
|---|---|---|---|---|
| 5,487,624 | A * | 1/1996 | Toyota .................. | B05B 12/085 406/14 |
| 5,739,429 | A * | 4/1998 | Schmitkons .......... | B05B 12/085 73/196 |
| 6,176,647 | B1 | 1/2001 | Itoh | |
| 6,494,645 | B1 * | 12/2002 | Seitz ..................... | B05B 7/1472 406/197 |
| 11,344,902 | B2 * | 5/2022 | Seitz ..................... | B05B 7/1477 |
| 2006/0093442 | A1 * | 5/2006 | Kleineidam .......... | B05B 12/006 406/10 |
| 2007/0233412 | A1 * | 10/2007 | Gotoh ................... | G01F 1/6847 702/50 |

FOREIGN PATENT DOCUMENTS

| | | | |
|---|---|---|---|
| DE | 103 53 968 | A1 | 7/2005 |
| DE | 10 2005 006 522 | B3 | 8/2006 |
| DE | 10 2017 103 316 | A1 | 8/2018 |
| DE | 10 2018 133 713 | A1 | 7/2020 |
| EP | 2 77 821 | A1 | 8/1988 |
| EP | 0693973 | A1 | 1/1996 |
| EP | 1958899 | A1 | 8/2008 |
| EP | 2777821 | A1 | 9/2014 |
| EP | 3 238 832 | A1 | 11/2017 |
| EP | 3685924 | A1 | 7/2020 |
| WO | 2003/024612 | A1 | 3/2003 |
| WO | 2005/051549 | A1 | 6/2005 |
| WO | 2009/037540 | A2 | 3/2009 |
| WO | 2014/161718 | A1 | 10/2014 |
| WO | 2014/202342 | A1 | 12/2014 |

OTHER PUBLICATIONS

User Manual, edition Nov. 2020, Wagner GmbH, 88677 Markdorf, order No. DOC2368103 (now accompanied with copy of reference).

* cited by examiner 33.2

33.1

33

33.3

33

33.2

33.1

33.3

33.2

A - A

33

33.1

9.2

33.3

PS

A 33.2

33

33.3

A

MEASURING DEVICE FOR MEASURING A COATING POWDER MASS FLOW RATE THAT CAN BE GENERATED BY MEANS OF COMPRESSED GAS IN A POWDER LINE AND CONVEYING DEVICE FOR COATING POWDER

TECHNICAL FIELD

The invention relates to a measuring device for measuring a coating powder mass flow rate that can be generated by means of compressed gas in a powder line and a conveying device for coating powder.

PRIOR ART

Conveying devices for conveying coating powder are known from the publications DE 10 2017 103 316 A1, DE 10 2018 133 713 A1, WO 2009/037540 A2, DE 10 2005 006 522 B3, EP 2 77 821 A1, WO 2003/024612 A1, DE 102 47 829 A1, WO 2005/051549 A1, EP 3 238 832 A1, DE 103 00 280 A1, DE 103 53 968 A1, WO 2014/161718 A1, WO 2014/202342 A1 and the user manual, edition 11/2020, Wagner GmbH, 88677 Markdorf, order number DOC2368103. These conveying devices have in common that they transport the coating powder through a powder line by means of compressed air. Over time, components of the conveying device can wear thereby, so that the parameters of the conveying device change and the actually conveyed coating powder mass flow rate thus also changes over time. Until now, no solution is known for how such a wear-related change of the coating powder mass flow rate can be detected.

DESCRIPTION OF THE INVENTION

It is an object of the invention to specify a measuring device for measuring a coating powder mass flow rate that can be generated by means of compressed gas in a powder line, by means of which the actual, current coating powder mass flow rate can be determined at any time.

The measuring device according to the invention has the advantage that a drift, which may occur over time, which is caused, for example, by a component wear, can be determined with it. This information about the drift can be used, for example, to signal to the operating personnel that a drift has taken place. The information can also be used to manually or automatically adapt the conveying parameters in the case of a powder conveyor. The coating quality can thus be kept at a constantly high level in an advantageous manner.

The degree of wear of the conveying device can be determined by means of the measuring device according to the invention, in order to be able to take suitable measures, if the wear has exceeded a certain level.

The object is solved by means of a measuring device for measuring a coating powder mass flow rate that can be generated by means of compressed gas in a powder line with the features specified in patent claim 1.

The measuring device according to the invention for measuring a coating powder mass flow rate that can be generated by means of compressed gas in a powder line comprises a control and evaluation unit, which is formed and can be operated in such a way that it can change between an offset mode and an operating mode. In the offset mode, the control and evaluation unit ensures that a setting means applies compressed gas to the powder line and prevents the coating powder flow in the powder line, and that a pressure sensor then detects the pressure in the powder line. The control and evaluation unit interprets the detected pressure as offset pressure value. In the operating mode, the control and evaluation unit ensures that the setting means releases the coating powder flow in the powder line, and then determines the coating powder mass flow rate flowing through the powder line on the basis of the pressure detected by the pressure sensor in the powder line, the offset pressure value and a correction value.

Advantageous further developments of the invention follow from the features specified in the dependent patent claims.

In the case of one embodiment of the measuring device according to the invention, the setting means comprises a compressed gas source.

In the case of a further embodiment of the measuring device according to the invention, the setting means comprises a locking element.

In the case of an additional embodiment of the measuring device according to the invention, the control and evaluation unit is formed and can be operated in such a way that it repeatedly changes into the offset mode and determines the offset pressure value anew.

In the case of a further embodiment of the measuring device according to the invention, the control and evaluation unit is formed and can be operated in such a way that it determines the coating powder mass flow rate anew.

In the case of the measuring device, it can additionally be provided that the control and evaluation unit is formed and can be operated in such a way that it can change into a calibrating mode. In the calibrating mode, it ensures that the setting means releases the coating powder flow in the powder line for a certain time period, the pressure sensor then meanwhile detects the pressure in the powder line, and the control and evaluation unit interprets the detected pressure as further pressure value. The control and evaluation unit determines the correction value on the basis of the coating powder mass, which has flown through the powder line during this time period, and the two pressure values.

In the case of a further development of the measuring device according to the invention, the control and evaluation unit is formed and can be operated in such a way that it repeatedly changes into the calibrating mode and determines the correction value anew.

In the case of another further development of the measuring device according to the invention, the control and evaluation unit is formed and can be operated in such a way that it, when the newly determined correction value deviates from the previous correction value, adapts it and/or signals the deviation.

In the case of an additional further development of the measuring device according to the invention, a powder sensor is provided, in order to detect whether coating powder flows through the powder line.

In the case of another further development of the measuring device according to the invention, the powder sensor is arranged in a spray applicator, which is connected to the powder line. It can be clearly detected thereby whether powder is actually sprayed. When the powder sensor is positioned close to the conveying device, the detection whether powder is actually sprayed is at least made more difficult. Reasons for this can be, for example, that the powder line has a leak or slipped off the sleeve. This would have the result that a workpiece is coated only insufficiently.

In the case of the measuring device according to the invention, the powder sensor is preferably formed as influence sensor or as optical sensor.

In the case of another further development of the measuring device according to the invention, the control and evaluation unit is formed and can be operated in such a way that it calculates a smoothed pressure value from several pressure values detected by the pressure sensor. A smoothed pressure value is understood, for example, to be a time-averaged pressure value.

The conveying device according to the invention for coating powder comprises the above-specified measuring device and a powder conveyor, which can be operated with compressed gas and which is connected to the powder line on the outlet side. It is furthermore provided that the coating powder flow in the powder line can be prevented by means of the setting means.

In the case of a further development of the conveying device according to the invention, the powder line is connected to a spray applicator on the outlet side.

In the case of another further development of the conveying device according to the invention, the compressed gas source has a compressed gas locking element.

In the case of an additional further development of the conveying device according to the invention, the compressed gas source has a volume flow controller, which is provided to keep the compressed gas volume flow rate, which is supplied to the powder conveyor, at a predeterminable, constant value.

In the case of another further development of the conveying device according to the invention, the powder conveyor has an injector.

In the case of an alternative embodiment of the conveying device according to the invention, the powder conveyor has a working container, which can be pressurized, comprising a powder inlet and a powder outlet, wherein the powder outlet is connected to the locking element.

The powder line has an inlet for transport gas on the inlet side.

In the case of an additional embodiment of the conveying device according to the invention, the control and evaluation unit is formed and can be operated in such a way that it controls the controllable compressed gas source so that a certain coating powder mass flow rate is reached.

In the case of an embodiment of the conveying device according to the invention, a powder supply line is provided, via which the powder conveyor can be supplied with coating powder from a powder storage container.

In the case of the conveying device according to the invention for conveying coating powder, it can advantageously also be determined whether the powder line is clogged.

By means of the measuring device in the case of the conveying device according to the invention, it can additionally also be determined whether a leak is present in the powder line.

It is a further advantage of the measuring device that, when conveying coating powder, it can be determined by means of the measuring device whether the coating powder flows through the powder line in surges.

The measuring device furthermore has the advantage that it can be used to detect whether the powder line is laid unfavorably or not optimally, respectively, in the case of the coating device.

The method according to the invention for measuring the coating powder mass flow rate by means of the above-specified measuring device comprises the following steps.

The control and evaluation unit is brought into the offset mode. Compressed gas is applied to the powder line by means of the setting means and the coating powder flow in the powder line is prevented. The pressure in the powder line is detected by means of the pressure sensor and is interpreted as offset pressure value. The control and evaluation unit is brought into the operating mode, the coating powder flow in the powder line is released with the help of the setting means, and the pressure in the powder line is detected by means of the pressure sensor. The control and evaluation unit determines the coating powder mass flow rate flowing through the powder line with the help of the detected pressure, the offset pressure value and the correction value.

BRIEF DESCRIPTION OF THE DRAWINGS

The invention will be described further below with several exemplary embodiments on the basis of 19 figures.

WAYS FOR CARRYING OUT THE INVENTION

Figure 1:
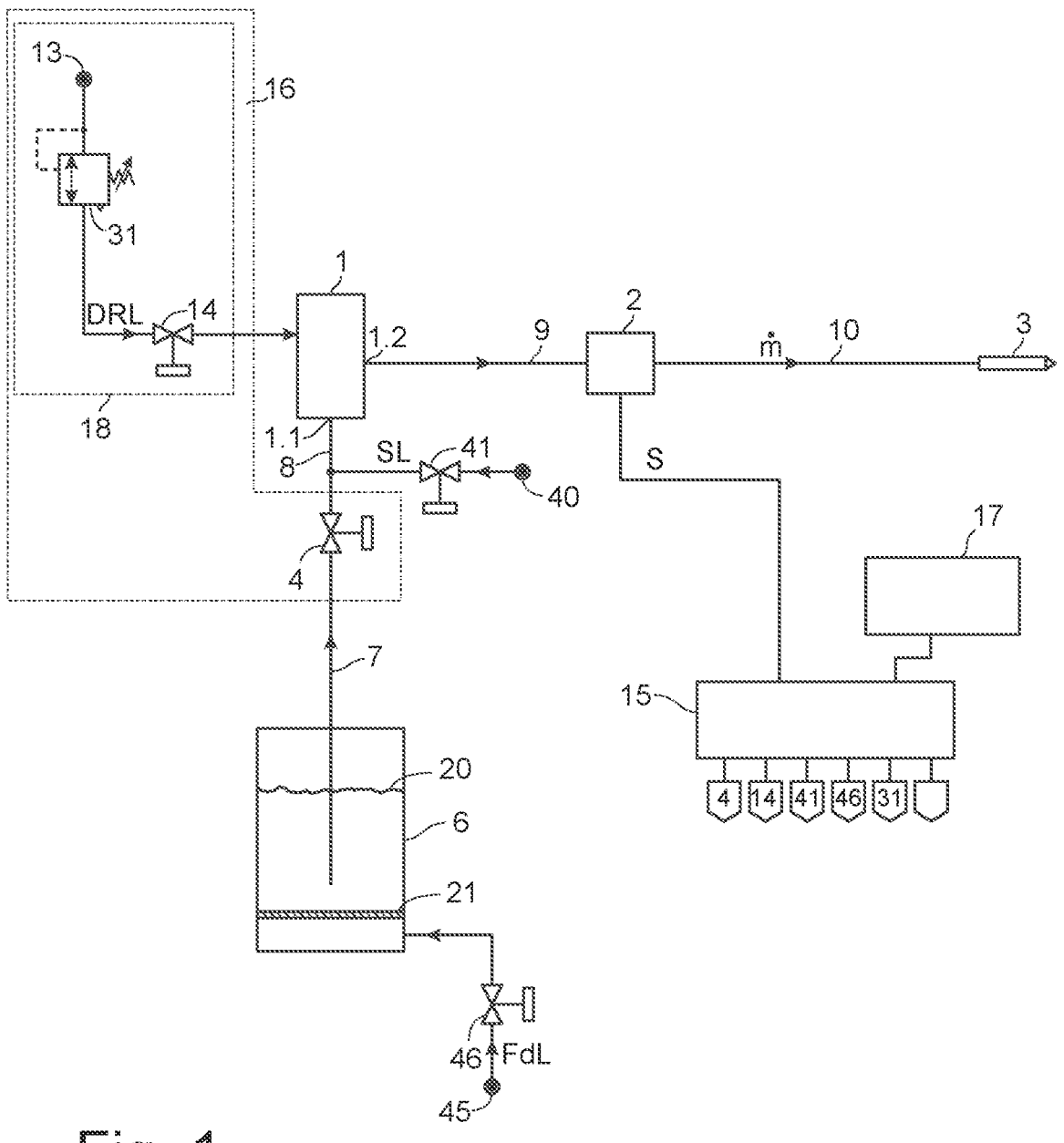
FIG. 1 shows, in the form of a block diagram, a first possible embodiment of a coating device with a first possible embodiment of the measuring device according to the invention for measuring the coating powder mass flow rate.

The block diagram in FIG. 1 shows a first possible embodiment of the coating device with a first possible embodiment of the conveying device for coating powder and a first possible embodiment of the measuring device for measuring the coating powder mass flow rate m.

The coating device for coating a workpiece with coating powder comprises the conveying device comprising a powder conveyor 1 and a powder storage container 6, from which the powder conveyor 1 can be supplied with coating powder 20 via a powder line 7, 8. The powder conveyor 1, which can be operated with compressed gas, has a powder inlet 1.1 and a powder outlet 1.2. A setting means 16 is further provided, by means of which the powder inlet 1.1 of the powder conveyor 1 can be closed. On the outlet side, the powder conveyor 1 is connected to a powder line 9, 10. Via the powder line 9, 10, a powder applicator 3 is supplied with coating powder. For example, a manual or an automatic powder spray gun can serve as powder applicator or spray applicator 3 or, in short, as applicator. A pressure sensor 2 is provided to be able to measure the pressure p prevailing in the powder line 9, 10.

The setting means 16 comprises a locking element 4, which can be, for example, a valve. The locking element 4 is located in the powder line 7, 8 and can prevent or release the coating powder flow in the powder line 7, 8.

The control of the locking element 4 takes place via a control and evaluation unit 15. The control and evaluation unit 15 can be connected to the setting means 16 in a wired or wireless manner. The connection to the locking element 4 is suggested by means of the framed numeral 4 below the controller 15. The setting means 16 additionally comprises a controllable compressed gas source 18, via which the powder conveyor 1 can be supplied with compressed gas DRL. The compressed gas source 18 has a controllable valve 14, via which the compressed gas DRL can be supplied to the powder conveyor 1. The control of the valve 14 likewise takes place via the control and evaluation unit 15. The control and evaluation unit 15 will also be referred to in short below as controller. The compressed gas source 18 can additionally have a pressure control valve 31, in order to keep the compressed gas DRL provided by a compressed gas source 13 at a constant pressure value.

When reference is made here to compressed gas, this refers to a gas or also a mixture of different gases, which is pressurized, the pressure of which is thus higher than the atmospheric pressure. The mixture of different gases can be, for example, air, which, as is well known, consists primarily of nitrogen and oxygen and to a small extent of other gases (in particular argon). The atmospheric pressure is a function of the geographic height.

On principle, the pressure sensor 2 can be arranged at any point in the powder line 9, 10 and can detect the pressure p prevailing in the powder line 9, 10 at any point in the powder line 9, 10. The pressure signal S generated by the pressure sensor 2 is supplied to the controller 15.

The powder line 9, 10 can extend all the way into the powder conveyor 1. It can thus start, for example, where the powder line 8 ends. The powder line 9, 10 can also extend all the way into the spray applicator 3, and can end, for example, at the opening of the spray applicator 3. As needed, the powder line 9, 10 can be formed completely or partially as hose.

A preferably horizontally running, porous dividing wall 21, which is permeable for fluidizing gas FdL, is preferably located in the lower region of the powder storage container 6. The powder 20 located above the porous dividing wall 21 is stirred up by means of the fluidizing gas FdL, which is guided through the porous dividing wall 21 from below and is set into a floating state. The fluidized powder 20 located above the dividing wall 21 can be transported out of the powder storage container 6 via the powder line 7, 8 to the powder conveyor 1. To be able to control the fluidizing gas FdL, a valve 46 is provided in the line between the compressed gas source 45 and the powder storage container 6. The valve 46 can be formed, for example, as air quantity control valve. A vibrating device, which has, for example, a vibrating motor (not shown in FIG. 1) can additionally be mounted to the powder storage container 6 in order to support the generation of a homogenous powder-gas mixture.

A spray gas connection 40 can furthermore be provided, which provides flushing gas SL. The flushing line, which connects the flushing gas connection 40 via the powder line 8 to the powder conveyor 1, can be interrupted by means of a valve 41. When the valve 41 is open, the flushing gas SL flows through the powder line 8, the powder conveyor 1, the powder line 9, 10 and the spray applicator 3. With the flushing gas SL, the powder located there is removed via the spray applicator 3 and the coating device is cleaned in this way.

Measurement of the Coating Powder Mass Flow Rate

The measurement of the coating powder mass flow rate m, which will also be referred to below as powder mass flow rate or, in short, as mass flow rate, can take place as follows, as illustrated in the flow charts in FIGS. 5 and 6.

When the coating device (coating system) is put into operation for the first time, a calibration is preferably carried out at the beginning. If necessary, the calibration can also be carried out repeatedly. It is the goal of the calibration to determine a so-called correction value k. For this purpose, the control and evaluation unit 15 goes into a calibrating mode 501. In the calibrating mode 501, the coating powder flow in the powder line 9, 10 is prevented (step 502 and 601) by means of the setting means 16, and compressed gas is applied to the powder line 9, 10 (step 602). The pressure p is now detected in the powder line 9, 10 (step 603) by means of the pressure sensor 2 and is supplied to the controller 15 as pressure signal S. The controller 15 interprets the pressure p determined in this system state as offset pressure value $p_{off}$ (step 604). The steps 601 to 604 are referred to as first phase.

The above-described method supplies a particularly exact offset value $p_{off}$. The more exact the offset value $p_{off}$, the more exactly the coating powder mass flow rate ṁ can be determined as well.

The setting means 16 subsequently releases the coating powder flow in the powder line 9, 10 (step 502.1) and it is ensured that powder is conveyed through the line 9, 10 with the help of the powder conveyor 1. The powder mass m, which flows through the line 9, 10 (step 503) during a certain time period $\Delta t$, is now determined. This is also referred to as calibration phase. The pressure p in the powder line 9, 10 is additionally detected anew by means of the pressure sensor 2 (step 503). It can optionally be provided that the coating powder flow is subsequently interrupted again (step 503.1). This is referred to as second phase. The controller 15 interprets this pressure, which is detected during the time period $\Delta t$, as pressure value $p_k$. From the powder mass m determined in this way, the pressure value $p_k$ prevailing in the line 9, 10 during the time period $\Delta t$ and the offset pressure value $p_{off}$, the controller 15 determines the correction value k (step 504) for example by means of the following formula:

$$k = \frac{m}{p_k - p_{off}}$$

The calibration is thus concluded.

Due to the fact that the pressure p is generally not exactly constant during the first phase, it can be provided that the offset pressure value $p_{off}$ is a pressure value, which is averaged over a defined time period. The same applies analogously also for the pressure value $p_k$. Due to the fact that the pressure p is generally also not exactly constant during the second phase, it can be provided that the pressure value $p_k$ is the pressure value averaged over the time period $\Delta t$.

When the correction value k is available to the controller 15, the latter can change into a further mode, which will be referred to below as operating mode. If the controller 15 is in the operating mode (step 505), the coating powder flow is released in the powder line 9, 10 (step 506) by means of the setting means 16. As soon as the powder conveyor 1 transports powder through the powder line 9, 10, the pressure p in the powder line 9, 10 is detected by means of the pressure sensor 2 and is supplied to the controller 15 as pressure signal S (step 507). The controller 15 interprets the pressure p determined in the operating mode as pressure value $p_{mess}$. The controller 15 can now determine the coating powder mass flow rate ṁ flowing through the powder line 9, 10 on the basis of the pressure value $p_{mess}$, the offset pressure value $p_{off}$ and the correction value k on the basis of the following formula (step 508):

$$\dot{m} = k \cdot (p_{mess} - p_{off})$$

The coating device can have a display 17, on which the coating powder mass flow rate ṁ is output, for example in g/min or kg/h.

When the controller 15 determines an unintentional change of the coating powder mass flow rate ṁ, it can signal this to the operating personnel or can accordingly readjust it automatically, so that the setpoint value of the coating powder mass flow rate is reached again.

Deposits in the powder line 8, 9 can lead to a drift. This can be detected by means of the measuring device. If a change of this type was detected, the controller 15 can output a corresponding message to the operating personnel via the display 17 and can propose, for example, that the powder line should be flushed.

The controller 15 remains in the operating mode 505 until, for example, a certain time period has lapsed (for example 1 hour or 1 day) or a coating pause takes place. The controller subsequently changes into the offset mode 509 and determines the offset pressure value $p_{off}$ anew.

Over time, wear inevitably occurs at different components of a coating system. The operating parameters of the coating system change thereby, so that it can be useful to update the offset pressure value $p_{off}$.

For this purpose, the controller 15 can be brought into a further mode, which will be referred to below as offset mode. When the controller 15 is in the offset mode (step 509), the coating powder flow is prevented in the powder line 9, 10 by means of the setting means 16 (step 601) and compressed gas is applied to the powder line 9, 10 (step 602). The pressure p is now detected in the powder line 9, 10 by means of the pressure sensor 2 and is supplied to the controller 15 as pressure signal S (step 603). The controller 15 interprets the pressure p determined in this system state as new offset pressure value $p_{off2}$ (step 604). This sequence is generally the same as the sequence from the first phase of the calibrating mode 501.

If the new offset pressure value $p_{off2}$ deviates from the previous offset pressure value $p_{off}$ beyond a certain level, a message can be output to the operating personnel, for example by the controller 15 and the display 17. In addition, it is possible that the controller 15 updates the offset pressure value $p_{off}$ accordingly, it thus interprets the new offset pressure value $p_{off2}$ as offset pressure value $p_{off}$ from now on.

The operating personnel can carry out changes on the coating system. For example, one or several powder lines can thus be replaced with powder lines with a different length and/or a different cross section. It can be helpful in this case to carry out the calibration anew. The control and evaluation unit 15 can be formed so that it detects changes of this type and automatically changes into the calibrating mode 501.

When the control and evaluation unit 15 is formed accordingly, so that, for example, reference values for the powder lines are stored, it can also be sufficient to only determine the offset pressure value $p_{off}$ anew.

Figure 2:
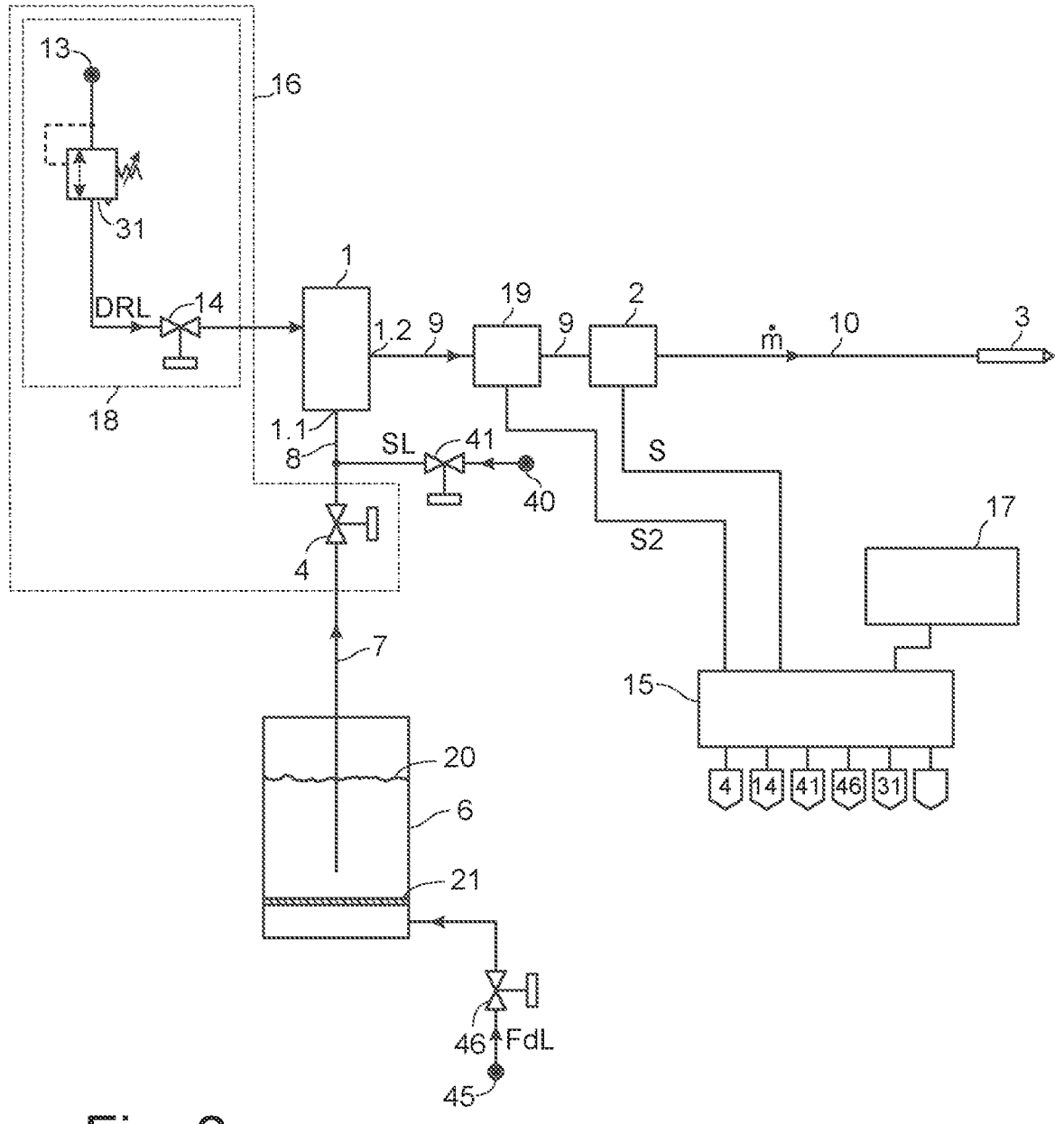
FIG. 2 shows, in the form of a block diagram, a second coating device with a second possible embodiment of the measuring device according to the invention for measuring the coating powder mass flow rate.

A second coating device with a second possible embodiment of the measuring device for measuring the coating powder mass flow rate ṁ is illustrated in the block diagram in FIG. 2. The coating device differs from the coating device shown in FIG. 1 only with regard to the measuring device. In addition to the measuring device from FIG. 1, the measuring device according to FIG. 2 comprises a powder sensor 19. The powder sensor 19 is located between the powder conveyor 1 and the pressure sensor 2. Alternatively, the powder sensor 19 can also be arranged on the downstream side of the pressure sensor 2 in the powder line 10 or also in the applicator 3. The powder sensor 19 detects whether powder flows through the line 9, 10 or the applicator 3, respectively, and transmits a correspond measuring signal S2 to the controller 15.

The powder sensor 19 can be formed, for example, as influence sensor or as optical sensor. The influence sensor as well as the optical sensor have the advantage that the measurement takes place in a contactless manner and the powder flow in the powder line 9, 10 is not influenced by the measurement.

Figure 9:
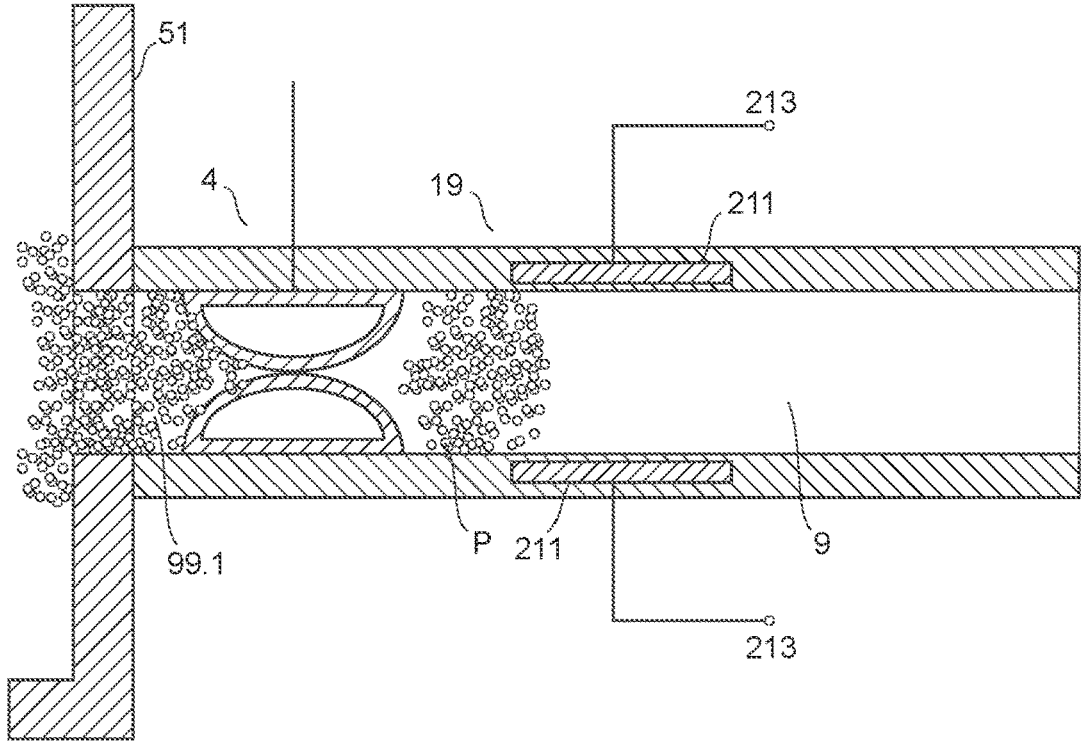
FIG. 9 shows the general setup of an influence sensor.

The measuring principle of the influence sensor 19, which is illustrated schematically in FIG. 9, is based on the influence effect of electrically charged powder particles P. If approaching a field-generating, for example positively charged powder particle P or, in short, particle of the neutral measuring electrode 211, which is arranged in an isolated manner, the electrons are pulled to that end of the measuring electrode 211, which faces the charged particle P. A negative charge is formed on this end. On the side of the measuring electrode 211 facing away from the particle, an electron deficiency forms and thus a positive charge. Only molecular dipole formation occurs in a non-conductor with stationary charges.

If a particle flows through the detection region of the ring-shaped measuring electrode 211, a first current pulse is created when the particle enters into the detection region of the measuring electrode 211, and a second current impulse with reversed signs when the particles exit. A previous, systematic charging of the particles is generally not required.

The totality of the electrically charged particles creates a space charge cloud, which, in turn, generates a corresponding electric field. Together with the particles, the electric field wanders through the detection region of the measuring electrode 211. Under the influence of the electric field, a temporary charge shift of the electrons, which are freely movable in the measuring electrode, occurs (influence). The charge influenced in the measuring electrode 211 thereby has the same amount as the charge of that portion of the space charge cloud, which is located in the detection region of the measuring electrode 211. When the space charge cloud moves in the powder line 9, a current i (t) is generated in the measuring electrode 211, the height of which depends on the speed v (t) of the cloud, with which it flows through the powder line 9.

The following applies for the space charge cloud density ρ:

$$\rho((r, \alpha, z)T, t) = e \cdot n \cdot N((r, \alpha, z)T, t)$$

Whereby:
N=number concentration,
n=average charge number of the particles,
e=elementary charge,
r, α, z=location coordinates,
t=time,
T=transposition.

The charge q enclosed by the measuring electrode 211 can be described by the following equation:

$$q(t) = \int \rho((r, \alpha, z)T, t)dV = \varepsilon \oint E((r, \alpha, z)T, t)dS$$

Wherein:
E=electric field strength,
ε=dielectric conductivity,
V=volume, which is enclosed by the electrode 211,
S=closed surface.

The following applies for the current i, which is measured at the output of the influence particle sensor 19:

$$i(t) = -\frac{d}{dt}q(t)$$

i=current from the measuring electrode 211 to the mass

The current i can be tapped as measuring signal S2 at the measuring signal connection 213 and can be supplied via an interconnected sensor electronics or directly to the controller 15.

The measurement of the powder flow can take place in the above-described way (see paragraph Measurement of the coating powder mass flow rate).

Figure 3:
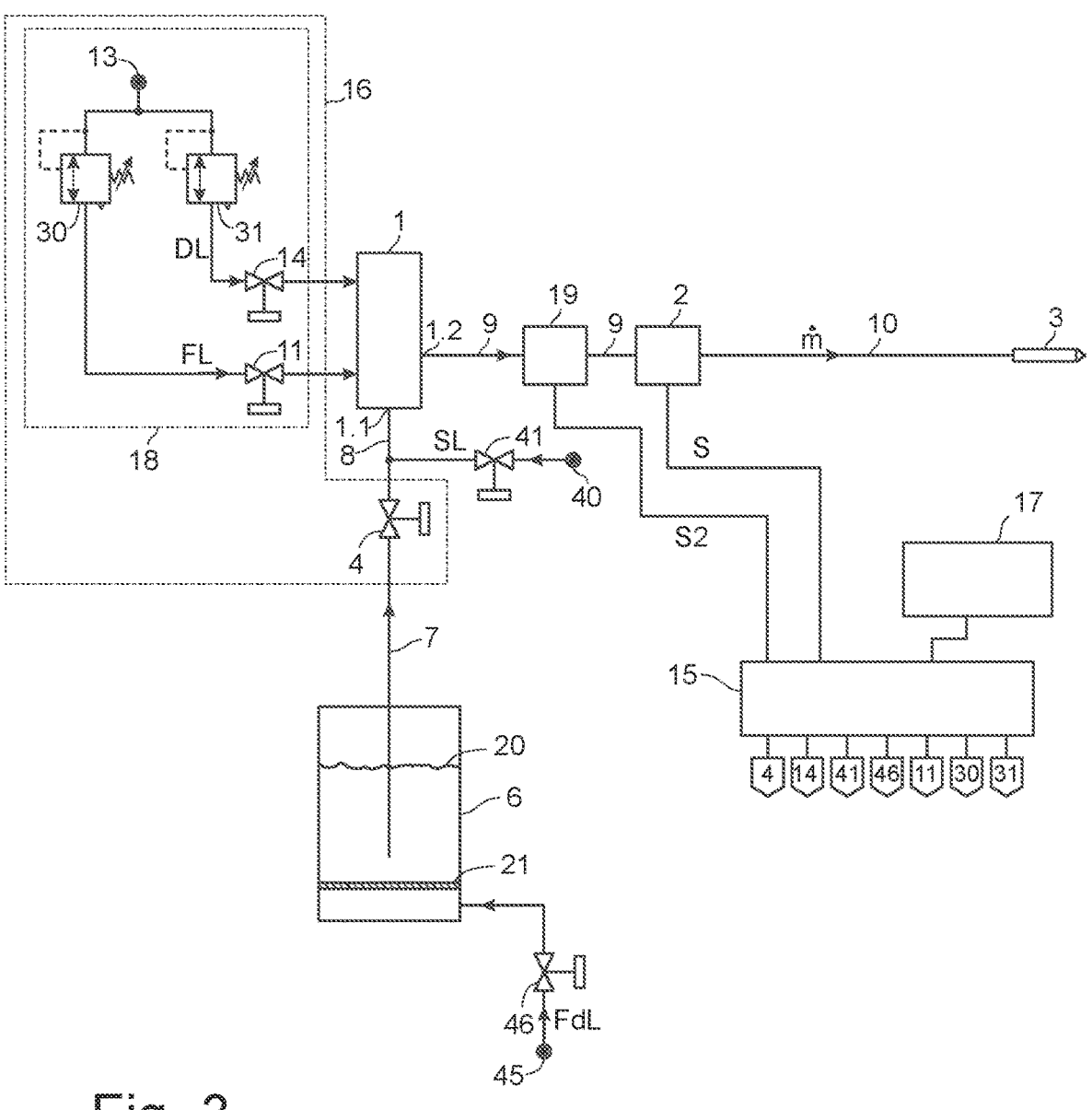
FIG. 3 shows, in the form of a block diagram, a third possible embodiment of the coating device with the measuring device for measuring the coating powder mass flow rate.
Figure 7:
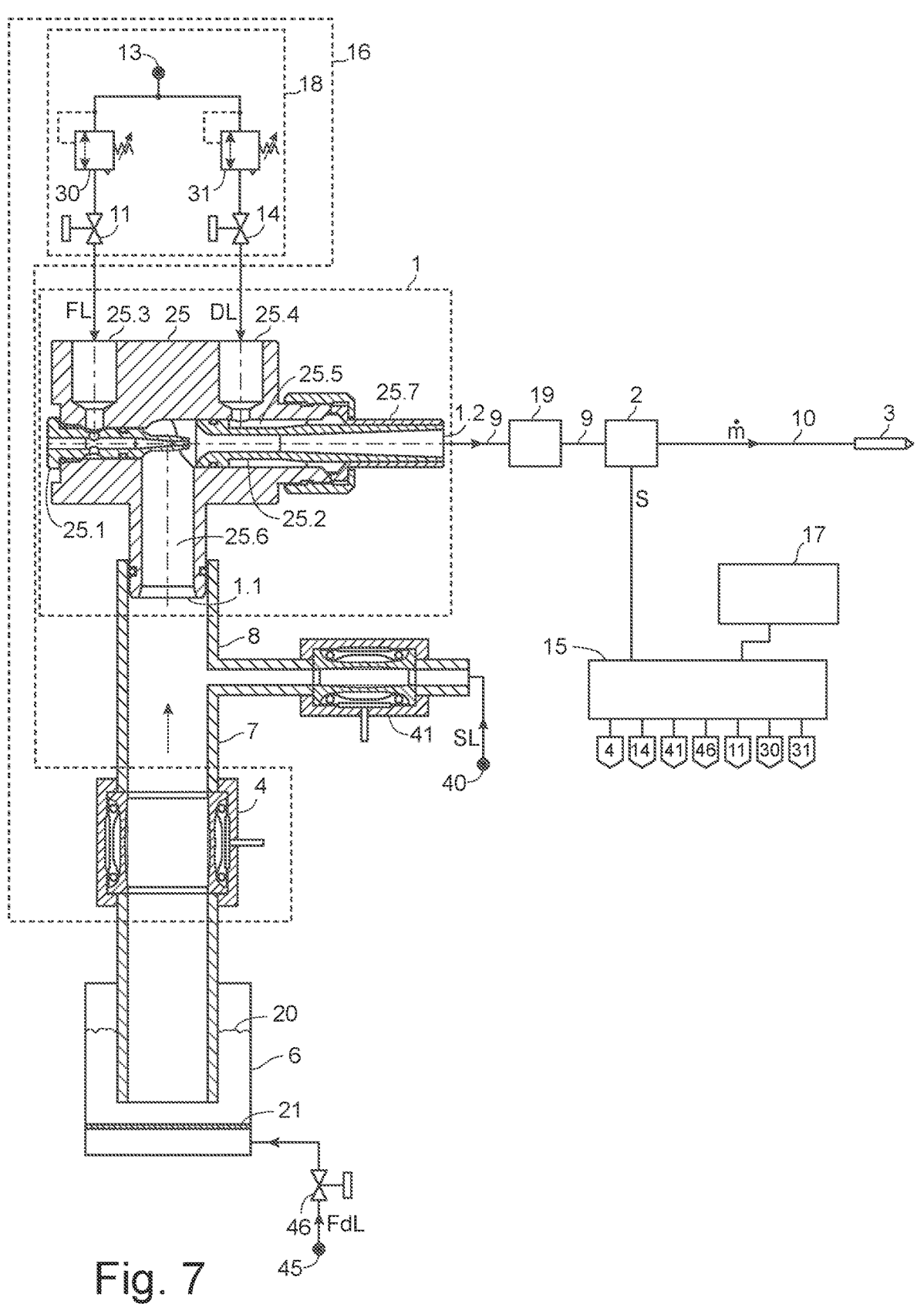
FIG. 7 shows a possible embodiment of the coating device comprising an injector.

A further embodiment of the coating device comprising the measuring device for measuring the coating powder mass flow rate ṁ is illustrated in FIG. 3. This coating device differs from the coating device from FIG. 2 with regard to the setting means 16. In FIG. 3, the setting means 16 does not only comprise the pressure control valve 31 and the valve 14, in addition to the compressed gas source 13, but additionally a further pressure control valve 30 and a further valve 11. Conveying gas FL is supplied to the powder conveyor 1 and valve 11 via the pressure control valve 30, and metering gas DL is supplied via the pressure control valve 31 and the valve 14. A powder conveyor 1 matching this configuration is shown in FIG. 7.

The setting means 16 can be operated so that it generates a compressed gas volume flow rate V̇, which is just so large that in particular no powder is taken in via the powder line 7, 8. The compressed gas volume flow rate V̇ is thereby made up of the two gas flows conveying gas volume flow rate V̇FL and metering gas volume flow rate V̇DL.

The pressure control of conveying gas FL and metering gas DL can take place with the help of a total air controller. The division of the compressed gas volume flow rate V̇ into conveying gas volume flow rate V̇FL and metering gas volume flow rate V̇DL can take place, for example, by means of a controlled spindle comprising stepper motor drive. Alternatively, the compressed gas volume flow rate V̇ can also be set by means of a separate controller for conveying gas and a separate controller for metering gas. The two controllers are advantageously formed as precision controllers.

The measurement of the powder mass flow rate can take place in the above-described way (see paragraph Measurement of the coating powder mass flow rate).

Figure 4:
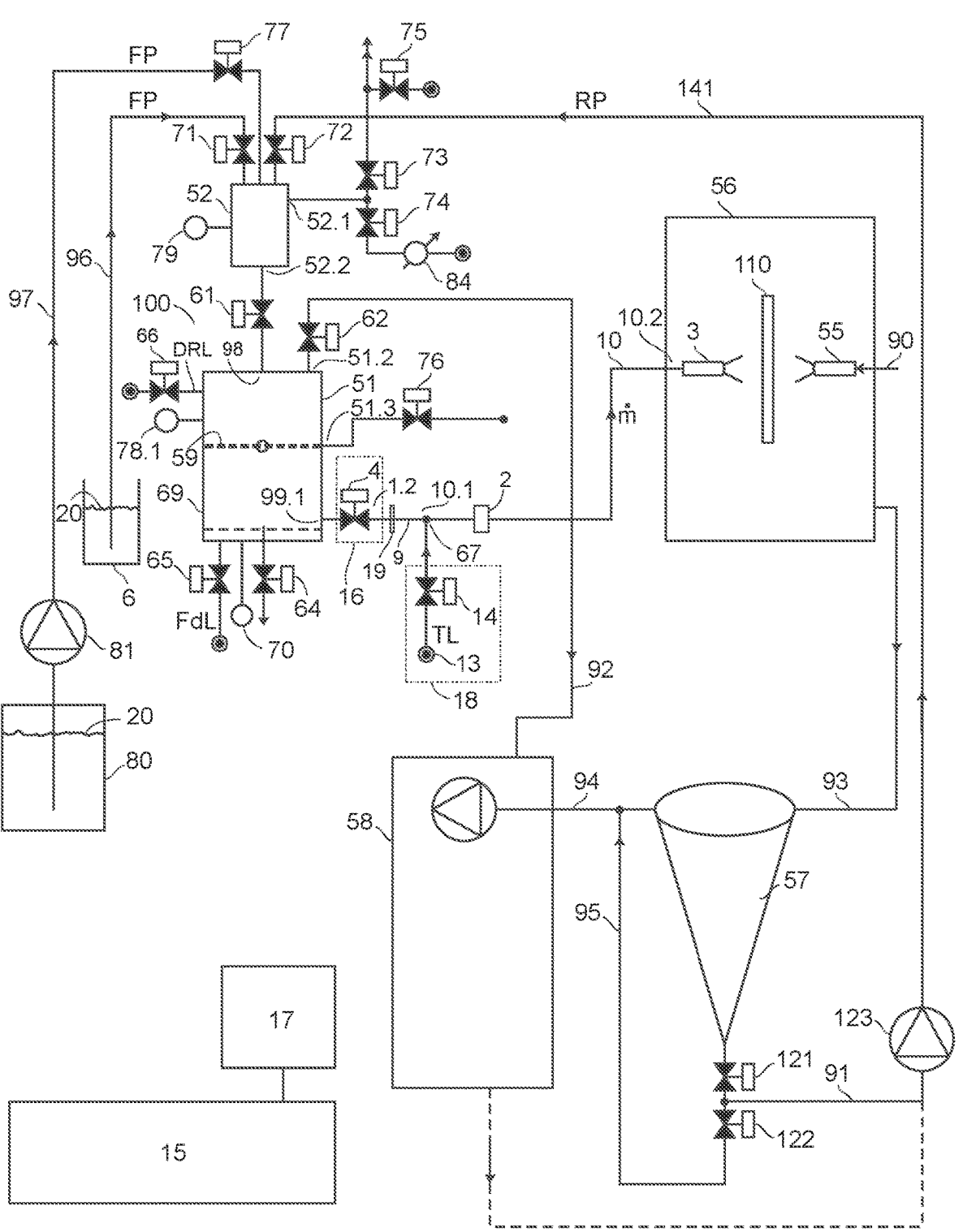
FIG. 4 shows, in the form of a block diagram, a fourth possible embodiment of the coating device with a further possible embodiment of the measuring device for measuring the coating powder mass flow rate.

FIG. 4 shows, in a block diagram, a fourth embodiment of a coating system comprising a powder conveying device 100. A section of the powder conveying device 100 is illustrated in detail in FIG. 8. The powder conveying device 100 for conveying coating powder to a powder applicator 3 comprises a working container 51. The latter is formed in a pressure-tight manner, so that it can be pressurized. The maximum working pressure in the working container 51 preferably lies below 0.5 bar because the European Pressure Equipment Directive 2014/68/EU then does not have to be applied and lower technical demands are thus made on the setup of the working container 51.

In one embodiment, the working container 51 comprises a powder inlet 98 and a powder outlet 99.1. The powder outlet 99.1 is connected to the locking element 4, which can be, for example, a powder outlet valve. The powder outlet of the locking element 4 is connected to the pressure sensor 2 via the powder line 9. The powder sensor 19 can be connected between the locking element 4 and the pressure sensor 2. The further powder line 10 connects to the pressure sensor 2. Its input-side end region 10.1 is connected to the outlet of the pressure sensor 2. In the following, the term on the input side refers to the input-side end region 10.1 of the powder line 10, which is located on the upstream side of the powder line 10.

On the input side, the powder line 10 also has an inlet 67 for transport gas TL, in addition to the outlet of the powder outlet valve 4. As in the case of the embodiments according to FIGS. 1 to 3, the powder line 10 in FIG. 4 is also connected to the powder applicator 3 on the output side. In the following, the term on the output side refers to the output-side end region 10.2 of the powder line 10, which is located on the downstream side of the powder line 10.

The powder outlet 99.1 is preferably located in the lower region of the working container 51. This has the advantage that all of the powder can be readily transported out of the working container 51. A fluidizing means 69 is also located in the lower region of the working container 51, by means of which the powder located in the working container 51 can be fluidized. The fluidizing means 69 has a dividing wall, which preferably runs horizontally, of a porous material, which can be, for example, a semi-permeable material, which is permeable for air. The powder located above the porous dividing wall is stirred up by means of the fluidizing air FL, which is guided through the porous dividing wall from below and is set into a floating state. The fluidized powder located above the fluidizing means 69 can then be transported out of the working container 51 through the powder outlet 99.1. To be able to control fluidizing gas FdL, a valve 65 is provided. The valve 65 can be formed, for example, as air quantity control valve. A vibrating device 70, which has, for example, a vibrating motor, can additionally be mounted to the working container 51 in order to support the generation of a homogenous powder-air mixture. A gas, such as, for example, nitrogen, can likewise be used instead of air.

A connection for a further valve 64 can likewise be provided in the lower region of the working container 51. The residual powder, which was not already transported away via the outlet 99.1, can be removed from the working container 51 via the valve 64.

A screen 59 can furthermore be arranged in the working container 51, which is preferably formed as ultrasonic screen. The screen 59 divides the interior space of the working container 51 into an upper chamber and into a lower chamber. With the help of the screen 59, the powder which has reached via the powder inlet 98 into the upper chamber of the working container 51, is screened. Powder clumps and contaminations are held back thereby. The screened powder, which is ready for removal, is located in the chamber below the screen 59. To be able to clean the screen 59, it can be pivoted out of the horizontal and brought into an inclined position, so that the residual powder, which lies on the screen 59, and/or the held-back material can slide down from the screen 59.

A compressed air connection can additionally be provided on the working container 51, which is connected to a compressed gas source via a valve 66. When the valve 66 is open, compressed gas DRL can flow into the working container 51. The working container 51 can thus be pressurized and the desired working pressure can be set in the working container 51. Additionally or alternatively, the desired working pressure in the working container 51 can also be generated via the supplied fluidizing gas FdL. The fluidizing gas FdL is generally sufficient to generate the desired working pressure. If, however, a very large number of powder outlet valves 4 are open, for example, it could be that the fluidizing gas FL alone is not sufficient to maintain the working pressure. Compressed gas DRL is additionally used in this case in order to maintain the working pressure and to optionally compensate pressure fluctuations in the working container 51. The compressed gas DRL can be supplied independently of the fluidizing gas FdL. In order to obtain a well-fluidized powder-gas mixture, it is advantageous when the fluidizing gas FdL is set to a certain value. The compressed gas connection for the compressed gas DRL can be arranged, for example, as suggested in FIG. 4, in the upper region of the working container 51. When the working container 51 is equipped with viewing windows, the compressed gas connection can also be attached at a point of the working container 51, which makes it possible that the viewing windows can be blown free from the adhering powder by means of the compressed gas DL. The compressed gas DRL can also be used to compensate compressed gas losses, which are generated by means of smaller leakages.

The working container 51 can furthermore have a vent connection 51.2, which is connected to a valve 62, which serves as vent valve. The vent connection 51.2 can be connected, for example, to the afterfilter 58 via the valve 62. The vent connection 51.2 and the valve 62 can also serve the purpose of ensuring that the pressure in the working container 51 does not exceed a certain maximum pressure. The vent connection 51.2 and the valve 62 can additionally be used to keep the working pressure in the working container 51 constant.

The powder conveying device 100 can serve the purpose of supplying many powder applicators (only two powder applicators 3 and 55 are shown in FIG. 4). For this purpose, a corresponding number of powder outlets, locking elements 4, powder lines 9, 10 and measuring devices can be provided for the measurements of the powder mass flow rates at the working container 51.

The powder inlet 98 is preferably located in the upper region of the working container 51. It can be arranged, for example, in the cover of the working container 51. The powder inlet 98 is connected to the powder outlet 52.2 of an intermediate container 52 via a powder valve 61, which is formed, for example, as squeezer. The intermediate container 52 is generally arranged above the working container 51. The gravity can be used in this way to transport powder located in the intermediate container 52 downwards into the working container 51.

In the case of one embodiment of the working container 51, the powder inlet 98 is located in the center of the cover of the working container 51. This has the advantage that the powder also falls onto the center of the screen 59, so that it is distributed better over the entire screen 59. The powder inlet 98 can instead also be located laterally on the working container 51 above the screen 59.

In the embodiment shown in FIG. 4, the intermediate container 52 has, on the input side, a powder inlet and a powder inlet valve 71, via which fresh powder FP can be sucked or pumped into the intermediate container 52. On the input side, the intermediate container 52 additionally has a further powder inlet and a powder inlet valve 72, via which recycled powder RP can be sucked into the intermediate container 52. The two powder inlet valves 71 and 72 can be formed as squeezers. It is also possible, however, to provide only one powder inlet and one powder inlet valve at the intermediate container 52, via which either fresh powder FP or recycled powder RP can then be taken in or pumped.

The supply of the intermediate container 52 can take place, for example, via a powder storage container 6 and a powder line 96. The intermediate container 52 can instead also be supplied with fresh powder FP via a powder storage container 80, a powder pump 81 and a powder line 97.

The powder storage container 80 is often a so-called big bag, which is also referred to as flexible intermediate bulk container or FIBC, in short. The powder storage container 80 generally contains larger amounts of powder than the powder storage container 6. The powder storage container 80 also generally stands farther way from the intermediate container 52 than the powder storage container 6.

In the case of the powder storage container 6, the powder is conveyed into the intermediate container 52 via the negative pressure prevailing in the intermediate container 52. A further powder conveying device is thus not necessary and is thus cost-efficient.

When the powder storage container 80 is used, for example, in the form of a big bag, larger amounts of powder are generally also conveyed. For this purpose, it is advantageous when an additional powder conveying device, such as, for example, the powder pump 81 is used. The prevailing negative pressure helps here to remove the air from the intermediate container 52. The excess air in the intermediate container 52 can be discharged via the opening 52.1. A back pressure is thus not generated in the intermediate container 52.

It can also be advantageous when several intermediate containers 52 are present, via which the working container 51 is supplied with powder. The intermediate containers 52 (only one is shown in FIG. 4) can be mounted above the working container 51. When using two intermediate containers 52, they can be operated, for example, in a phaseshifted manner; while the one intermediate container takes in powder, thus works in the intake phase, the other intermediate container, which works in the outlet phase, transports the powder into the working container 51. The working container 52 is continuously filled with powder in this way. Large amounts of powder can thus be conveyed into the working container 52.

The intermediate container 52 has a connection 52.1, via which compressed gas can be applied to the intermediate container 52. For this purpose, the connection 52.1 can be connected to a compressed gas source via a valve 74. The valve 74 forms a controllable compressed gas source with the compressed gas source. A pressure control valve 84, which can be arranged between the compressed gas source and the valve 74, can be part of the controllable compressed gas source.

The compressed gas can be discharged from the intermediate container 52 via the connection 52.1. For this purpose, the connection 52.1 can be connected to the environment via a valve 73. However, the compressed air can also be sucked out of the intermediate container 52 via the connection 52.1 and a negative pressure can be generated. For this purpose, a vacuum valve 75 is additionally provided, which generates a negative pressure at the connection 52.1, when the valve 73 is open. The vacuum valve 75 serves as negative pressure generator.

The compressed gas sources illustrated in the block diagram according to FIG. 4 can be controlled compressed gas sources, which generate a constant pressure or a constant amount of gas.

Figure 8:
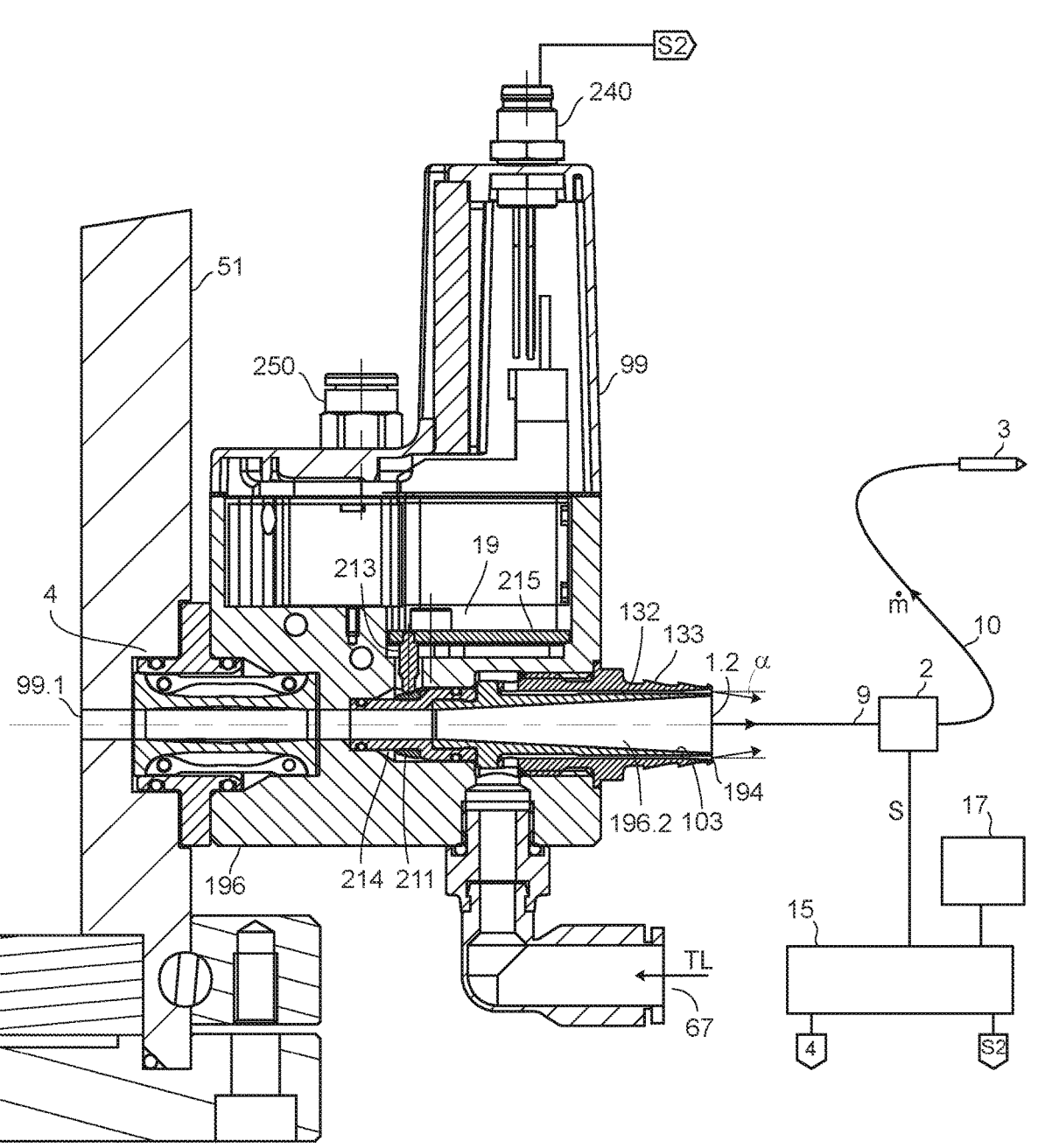
FIG. 8 shows a possible embodiment of the coating device according to FIG. 4.

In the case of the embodiment shown in FIG. 8, an outlet body 196 is fastened to the working container 51. The powder outlet valve 4 can be incorporated, for example, completely or partially, into the outlet body 196. The outlet body 196 can have the inlet 67 for the transport gas TL and an axially running transport gas channel 132, which surrounds the downstream end region of the powder channel 196.2 in a ring-shaped manner. As shown in FIG. 8, the powder channel 196.2 can run in a funnel-shaped manner and can widen in the downstream direction. The downstream section of the powder channel 196.2 can be formed as separate component, which is referred to as mouthpiece 103 in the following. On the upstream side, a sleeve 214 can be attached to the mouthpiece 103, which supports the measuring electrode 211 of the influence sensor 19. In the present exemplary embodiment, the measuring electrode 211 is formed in a ring-shaped manner and is connected to a sensor electronics 215 via the sensor connection 213. As shown in FIG. 8, the sensor connection 213 can be formed as contact pin and can be pushed onto the measuring electrode 211 by means of a (non-illustrated) spring. The sensor electronics 215 of the influence sensor 19, in turn, is connected to the controller 15 via an electrical connection 240 for transferring the sensor signal S2.

The outlet body 196 can receive a hose stem 133 with its downstream end region. The powder line 9 or the powder hose, respectively, can be pushed onto the hose stem 133 and can be fastened. A hose coupling, for example with a snap connection, is also conceivable here (not shown in the figures). The inner side of the hose stem 133 and the outer side of the mouthpiece 103 from the ring-shaped transport gas channel 132. The downstream ends of the hose stem 133 and of the mouthpiece 103 form a ring gap 194, which serves as downstream opening of the transport gas channel 132. To supply the transport gas channel 132, a transverse bore is provided in the outlet body 196. The transport gas TL flows through the transport gas channel 132 to the downstream end thereof and from there in a ring-shaped manner and at a flat angle α into the powder line 9.

It is advantageous when (as illustrated schematically in FIG. 8) the transport gas TL flows at a flat angle α in a ring-shaped manner into the powder line 9.

Allowing the transport gas TL to flow into the powder line 9 by means of the ring gap 194 has several advantages. Due to the fact that the transport gas TL is introduced through the ring gap 194 into the powder line 9 so that it has the same direction as the powder flow, a negative pressure is more likely created at the inlet 67 than a back pressure (no air resistance, no barrier). Fewer turbulence are thus generated in the powder line 9. The wear at the wall of the powder line 9 can additionally be reduced or even completely avoided.

Other embodiments are also possible for the outlet body 196. The outlet body 196 can have, for example, one or several channels, via which the transport gas TL is introduced into the powder line 9 at an angle of between 0 and 89 degrees. The transport gas TL flowing through these channels more likely generates a negative pressure in the powder line 40.

All valves 61 to 66, 68 and 71 to 76 can be controlled by means of the control and evaluation unit 15. If necessary, the valves 121 and 122 can also be controlled by means of the controller 15. The control connection for the powder outlet valve 4 and the signal input for the measuring signal S2 are shown in FIG. 8 in an exemplary manner at the controller 15. The control and evaluation unit 15 can be used to control as well as to regulate. It can comprise mechanical and electronic components. It can in particular comprise a micro-controller- or microprocessor-based computing unit.

The controller 15 preferably has a memory, in which standard values, for example for the length of certain hoses (powder lines), pressure values and/or correction values are stored. The standard correction values can be transferred, for example, to other spray applicators.

In addition to the powder conveying means 100 and the coating booth 56, the powder coating system can also have a cyclone 57 for recovering the powder and an afterfiler 58, as shown in FIG. 4.

In order to remove the overspray from the coating booth 56, it is sucked out of the booth as powder-air mixture, together with the air located in the coating booth 56, and is supplied to the cyclone 57, which can be formed as mono-cyclone. On the top, the powder-air mixture flows tangentially into the cyclone 57 and spirally downwards in the cyclone. Due to the centrifugal force generated in response to the rotation of the powder-air flow, the powder particles are pushed outwards against the outer wall of the cyclone. The powder particles are subsequently conveyed downwards in the direction of the powder outlet of the cyclone and are accumulated there. The air, which is freed from the powder particles, is extracted via a central pipe located in the cyclone. The air flow cleaned in this way can also be supplied to the afterfilter 58, in order to also filter out the residual powder that remained in the air. When the valve 121 is open, the recycled powder RP can be removed from the cyclone 57 and can be supplied to the powder conveying device 100 again via a pump 123 and a line 141. When the valve 122 is open, the powder filtered out in the cyclone can instead also be supplied to the afterfilter 58 via the lines 95 and 94.

The afterfilter 58 can be equipped with filter cartridges, which filter out the residual powder particles that remained in the air. A preferably electrically driven fan or a blower ensures the necessary airflow rate.

If no cyclone is used, the powder can also be removed from the afterfilter 58 and can be supplied to the powder conveying means 100 again via the pump 123 and the line 141.

Figure 5:
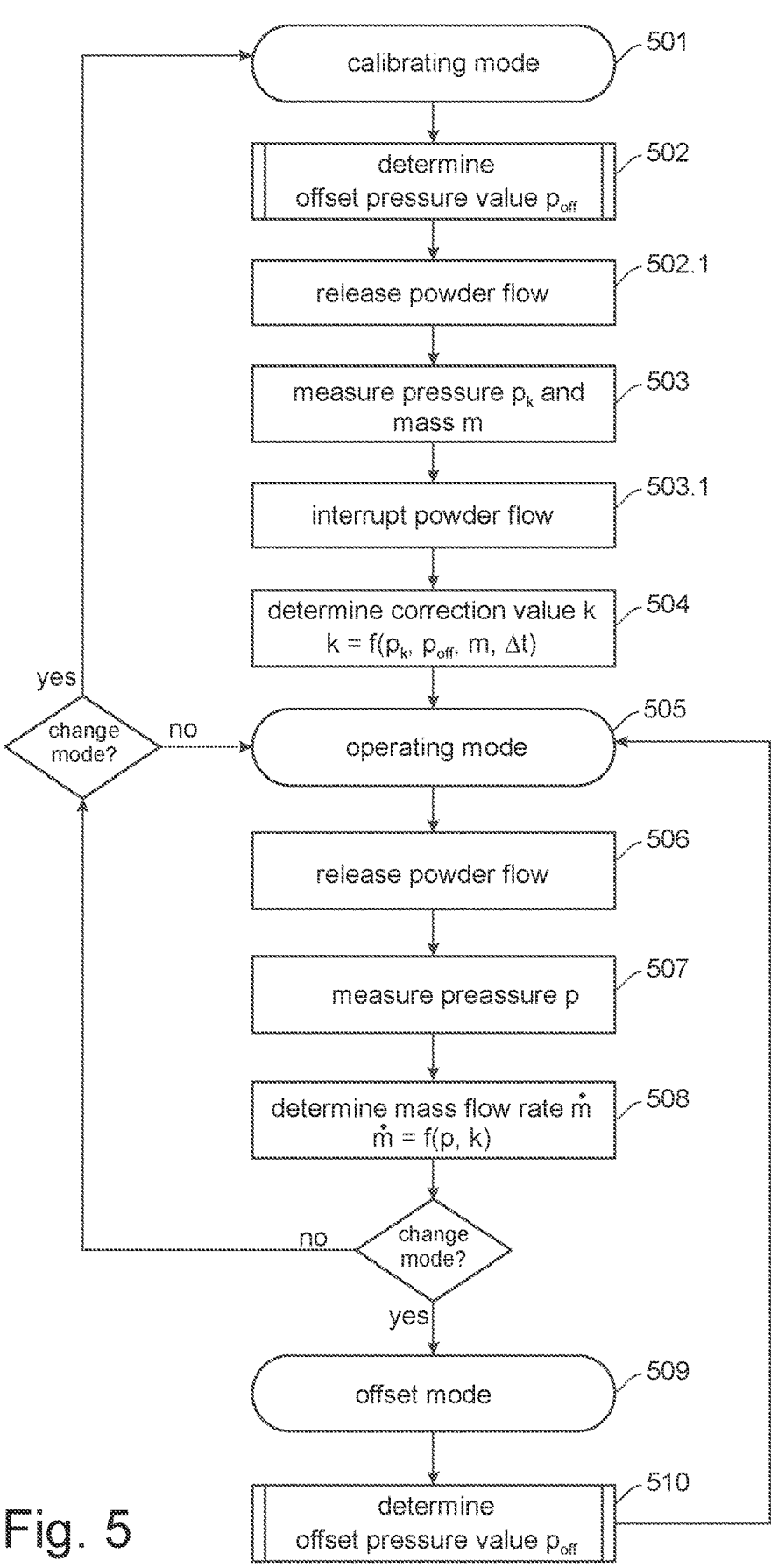
FIG. 5 shows, in a flow chart, a possible sequence of a measuring method for the coating devices.
Figure 6:
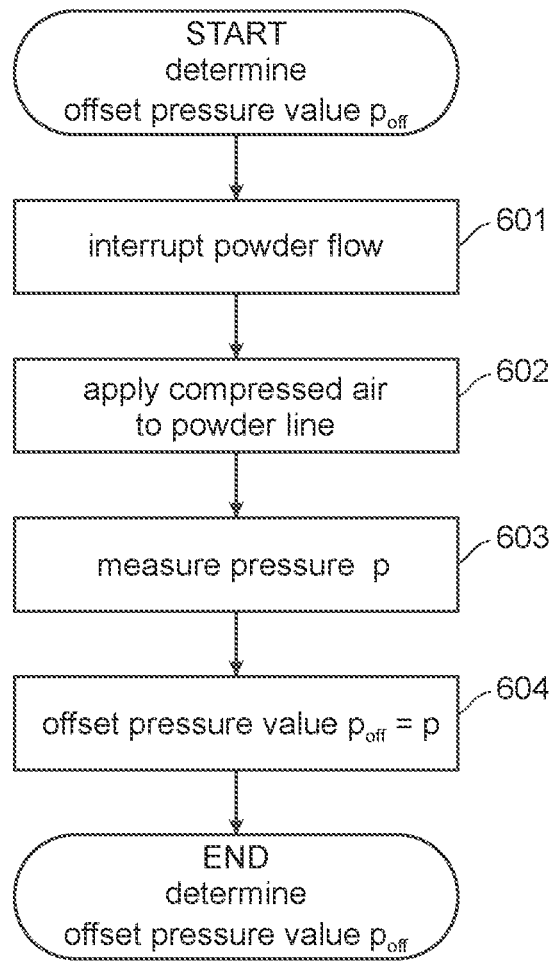
FIG. 6 shows, in a further flow chart, a sub-procedure of the measuring method.

The coating device illustrated in FIGS. 4 and 8 can also use the measuring method described in FIGS. 5 and 6.

In the case of the coating device illustrated in FIG. 7, the locking element 4 is formed as hose squeezer. The valve 41 is also formed as hose squeezer. This is not mandatory, however.

The injector 25 has a drive nozzle 25.1 and a collector nozzle 25.2. The powder inlet 1.1 of the injector 25 is connected to the powder storage container 6 via the powder line 8, 7. The powder outlet 1.2 of the injector 25 is connected to the powder line 9. The injector 25 additionally has a conveying gas connection 25.3, via which conveying gas FL is guided to the drive nozzle 25.1. In addition to the conveying gas connection 25.3, a metering gas connection 25.4 is provided at the injector 25, via which metering gas DL is guided into a ring-shaped metering gas channel 25.5, which is formed by the jacket surface of the collector nozzle 25.2 and the housing of the injector 25.

The drive nozzle 25.1 has a conveying gas inlet and, on its downstream end, a drive nozzle outlet. Coming from the conveying gas connection 25.3, the conveying gas FL is guided through the conveying gas inlet and the drive nozzle 25.1 and then flows out of the drive nozzle outlet in the direction of the collector nozzle 25.2. While the conveying gas FL flows to the collector nozzle 25.2, it generates a negative pressure in the intake channel 25.6 and receives powder 20 via the intake channel 25.6. The powder 20 is thus sucked out of the powder storage container 6 into the injector 25.

On its upstream end, the collector nozzle 25.2 has an opening with a defined radius. The opening is followed by an upstream cannel section, which serves as mixing pipe. This, in turn, is followed by a conical channel section, which widens in the downstream direction and which is formed as diffusor. The collector nozzle 25.2 if partly arranged in housing of the injector 25 and is braced with the housing of the injector via a guide sleeve 25.7 and a cap nut.

The metering gas DL flows into the powder line 9 through the metering gas inlet 25.4, the metering gas channel 25.5 and the downstream metering gas outlet. The metering gas outlet is located between the jacket surface of the collector nozzle 25.2 and the inner side of a guide sleeve 25.7. In the powder line 9, the metering gas DL mixes with the powder-conveying gas mixture, which flows out of the outlet of the collector nozzle 25.2.

An alternative method for determining the offset pressure value $p_{off}$ will be described below.

First, it should be noted that the sum of conveying gas FL and metering gas DL forms the total gas volume flow rate below. To determine the offset pressure value $p_{off}$, the proportion of the conveying gas volume flow rate in the total volume flow rate is initially set to 0%, and the proportion of the metering gas volume flow rate in the total volume flow rate is set to 100%. In this constellation, the gas does not only flow into the powder line 9, 10, but partly also into the powder storage container 6 because virtually no negative intake pressure is generated by the metering gas in the case of 0% of conveying gas. In a next step, the proportion of conveying gas FL is increased step-by-step, and the proportion of metering gas DL is reduced accordingly (whereby the total gas volume flow rate is kept constant). The conveying gas FL thereby gradually generates a negative pressure in the intake line 25.6 of the injector 25, and the amount of gas, which flows into the powder storage container 6, decreases. From a certain amount of conveying gas, the amounts of gas are balanced, 100% of the sum of conveying and metering gas flows into the powder line 9, 10. Powder is neither taken in from the powder storage container 6 via the intake line 25.6, nor is gas blown into the powder storage container 6. In order to find this state, the proportion of conveying gas FL is increased by one further unit in the next step. As soon as the powder senor 19 detects a powder flow (i.e. some powder is now taken in via the intake line 25.6), the proportion of conveying gas FL is reduced by one unit again. The controller 15 subsequently determines the offset pressure $p_{off}$ on the basis of the pressure, which was just detected by the pressure sensor 2.

This method for determining the offset pressure $p_{off}$ has the advantage that it can manage without the locking element 4. However, this method generally requires more time for the determination of the offset pressure $p_{off}$ than the above-described method.

Setup of the Pressure Sensor 2

Figure 10:
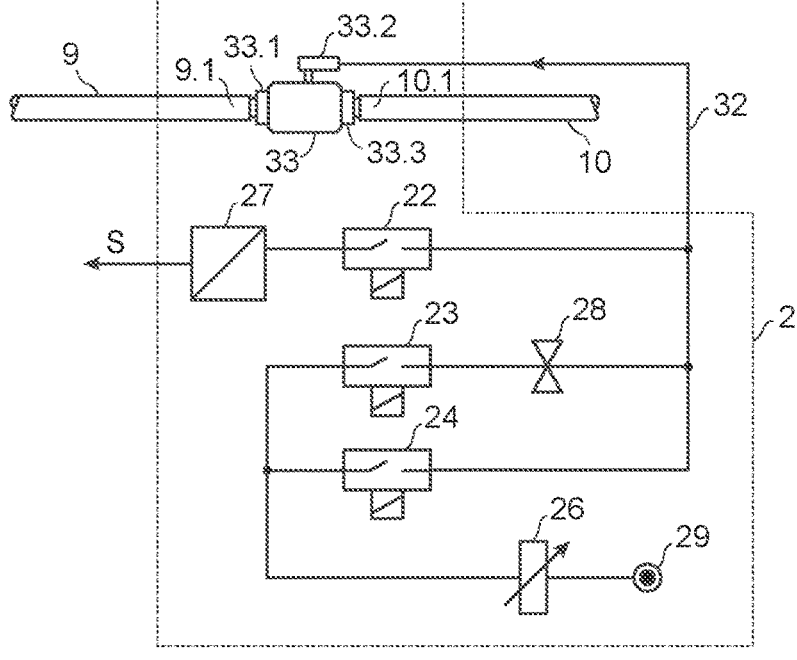
FIG. 10 shows the general setup of a pressure sensor.

On principle, the pressure sensor 2 can be set up, as shown, for example, in FIG. 10. A sensor coupling 33 comprising a powder inlet 33.1 and a powder outlet 33.3 is arranged in the powder line 9, 10. The sensor coupling 33 additionally comprises a sensor connection 33.2, to which a pressure sensor line 32 is connected. Compressed gas, which originates from a compressed gas source 29, can be fed into the powder line 9, 10 at a pressure p2 through an opening 9.2 via the pressure sensor line 32. The pressure p2 is thereby selected so that it is larger than the pressure, which prevails on the line end 9.1 in the line 9. It is thus ensured that no or only little powder reaches from the line 9, 10 into the pressure sensor lines 32 and to the pressure transducer 27. If this happens nonetheless, however, the valve 24, which acts as spray valve, can be opened. The compressed gas, which originates from the compressed gas source 29, then flows via the pressure sensor line 32 into the powder line 9, 10 and transports out the powder, which is possibly present in the pressure sensor line 32, in this way. If the pressure sensor line 32 is to not be flushed, the valve 24 is closed. When the valve 23 is open, the compressed gas originating from the compressed gas source 29, flows via an orifice 28 into the pressure sensor line 32, and from there into the powder line 9, 10. The orifice 28 serves the purpose of keeping the compressed gas volume flow rate $\dot{V}$, which flows into the powder line 10 via the opening 9.2, constant. The orifice 28 is preferably selected so that the compressed gas volume flow rate $\dot{V}$ is smaller, so that only little compressed gas reaches into the powder line 10. The pressure sensor 2 can have a further valve 22, which—when it is open—ensures that the compressed gas reaches the pressure transducer 27. If necessary, the valve 22 can also be used to protect the pressure transducer 27 when a flushing of the powder line 9, 10 with compressed gas is carried out. The pressure transducer 27 detects the pressure, which prevails on the line end 10.1, in this way.

Figure 11:
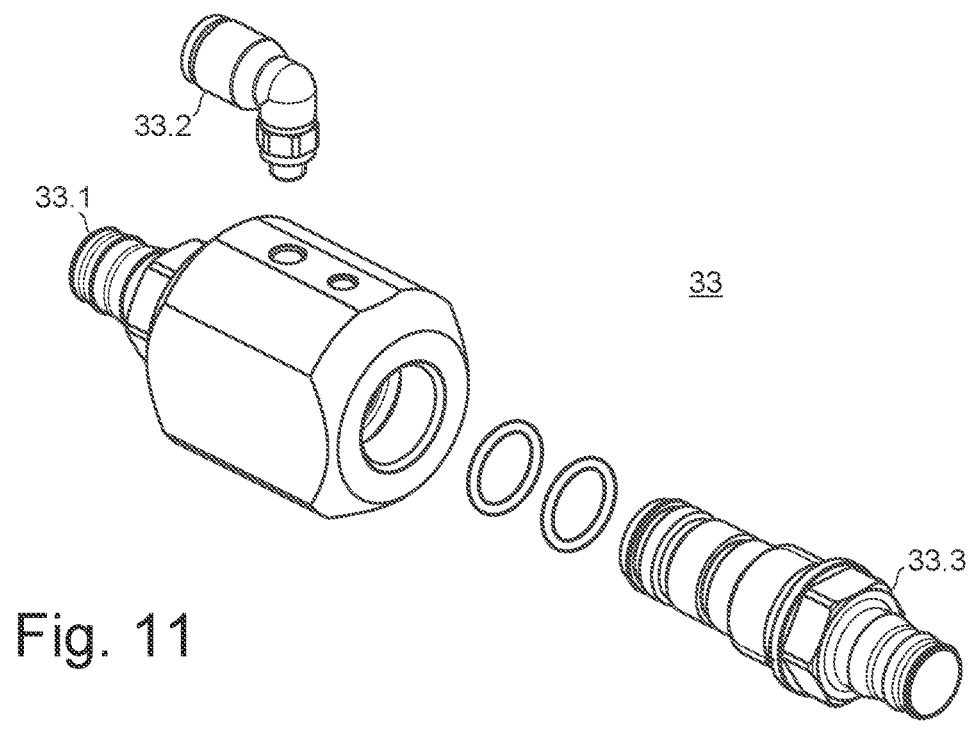
FIG. 11 shows a possible embodiment of a sensor coupling, which can be part of the pressure sensor.
Figure 12:
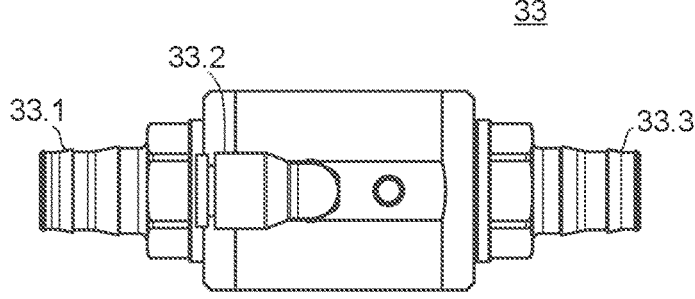
FIG. 12 shows the sensor coupling in the top view.
Figure 13:
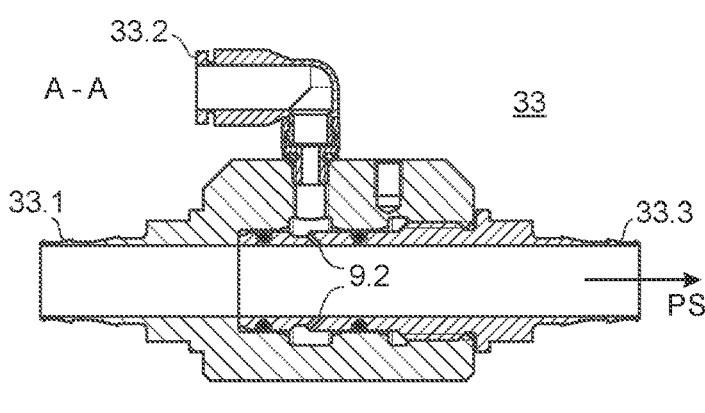
FIG. 13 shows the sensor coupling in the side view in section.
Figure 14:
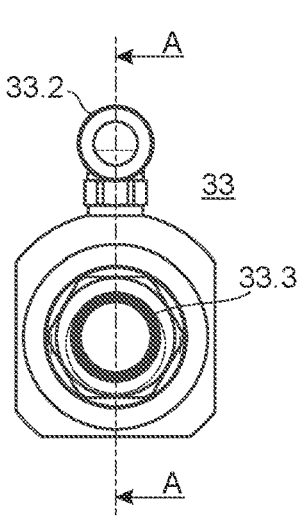
FIG. 14 shows the sensor coupling from the front.

FIG. 11 shows a possible embodiment of the sensor coupling 33 in an exploded view. In FIG. 12, the sensor coupling 33 is illustrated in the top view, in FIG. 13 in the side view in section and in FIG. 14 from the front. As can be seen in FIG. 13, several, preferably two openings 9.2, can be provided in the sensor coupling 33. The openings 9.2 are preferably arranged at an incline, namely so that the gas, which flows through them into the powder line 9, 10, impinges on the powder flow PS at a flat angle. This is better fluidically and has the advantage that when flushing the powder line 9, 10, less powder reaches into the pressure sensor line 32. The opening 9.2 preferably has or the openings 9.2 have, respectively, a small diameter with regard to the powder line 9, 10, for example 0.7 mm. Due to this, less powder also reaches into the pressure sensor line 32 during the operation as well as during the flushing.

Figure 15:
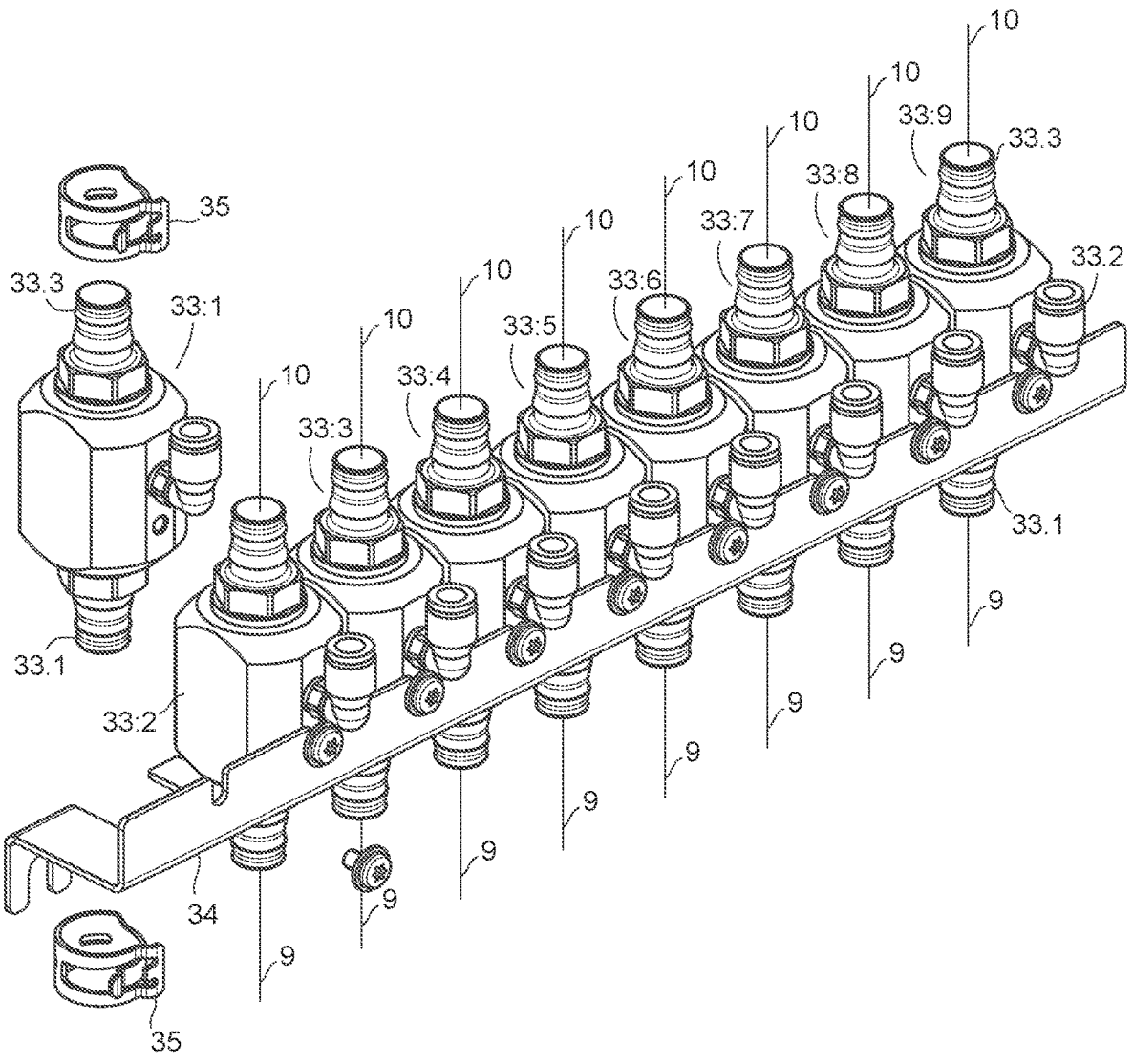
FIG. 15 shows a rail comprising several sensor couplings, which are lined up thereon.

The conveying device 100 (see FIGS. 4 and 8) can be equipped with several powder outlet valves 4 and a corresponding number of powder lines 9, 10, via which powder can in each case be conveyed separately out of the working container 51. If, for example, n valves 4 and n powder lines 9, 10 are provided, a separate pressure sensor 2 is preferably in each case provided for each of the n powder lines 9, 10. Each of the n pressure sensors 2 is then connected to the corresponding powder line 9. 10 via a separate sensor coupling 33. An assembly group comprising a rail 34 and nine sensor couplings 33:1-33:9, which are lined up on the rail 34, is shown in an exemplary manner in FIG. 15. With the help of a clip 35, which serves as hose clip, one of the powder lines 9, 10 is in each case fastened to the sensor coupling 33. A pressure sensor 2 (not shown in FIG. 15) is in each case connected to each of the nine sensor connections 33.2, which pressure sensor in each case transmits its sensor signal S to the controller 15. For each of the nine powder lines 9, 10, the controller 15 can thus in each case separately determine the coating powder mass flow rate ṁ, which currently flows through them.

Figure 16:
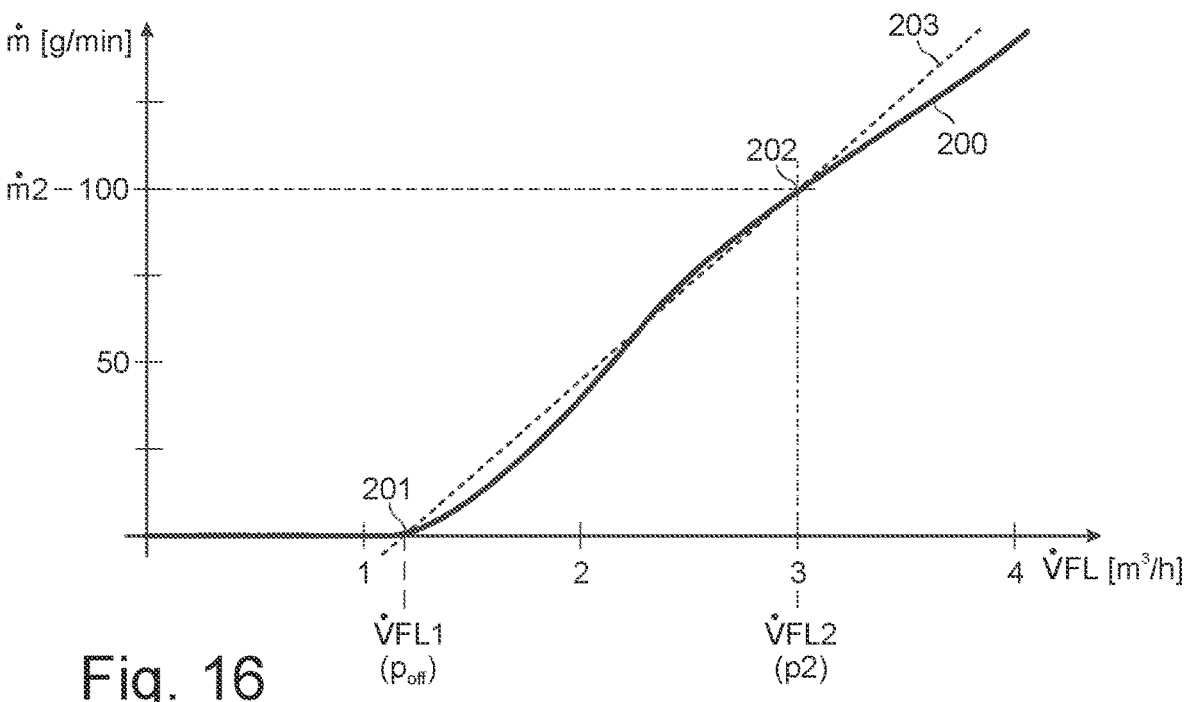
FIG. 16 shows, in an exemplary manner, the course of the coating powder mass flow rate as a function of the conveying gas volume flow rate for the coating device according to FIG. 1, 2 or 3.

FIG. 16 shows the curve progression 200 of the coating powder mass flow rate ṁ as a function of the conveying gas volume flow rate V̇FL in an exemplary manner for the coating powder device according to FIG. 1, 2 or 3, wherein the entire compressed gas volume flow rate V̇ in the powder line follows from the sum of conveying gas volume flow rate V̇FL and metering gas volume flow rate V̇DL. As can be seen from the curve progression 200, no coating powder mass flow rate appears in the case of a conveying gas volume flow rate V̇FL, which is smaller than V̇FL1. Powder starts to flow in the powder line 9, 10 only when the conveying gas volume flow rate is larger than V̇FL1. The boundary 201, at which powder does not yet flow or the powder just starts to flow, can be determined with the help of the powder sensor 19. The conveying gas volume flow rate V̇FL1, which flows at this boundary transition 201, can thus also be determined. If the conveying gas volume flow rate V̇FL is increased, the coating powder mass flow rate ṁ also increases. Due to the fact that the time period Δt as well as the powder mass m transported during this time period is known due to the calibration (see calibration process), the coating powder mass flow rate ṁ2 can be calculated. The conveying gas volume flow rate V̇FL2, which is set during the calibration, is likewise known. The position and the slope of the straight line 203 can thus be calculated from the points 201 and 202. The straight line 203 can serve as realistic approximation to the actual curve progression 200 and can be used to determine the coating powder mass flow rate ṁ, which belongs to a certain conveying gas volume flow rate V̇FL.

The pressure, which prevails in the line 9, 10 when powder sensor 19 indicates that one is at this boundary 201, can be measured by means of the pressure sensor 2. This pressure p corresponds to the offset pressure value $p_{off}$.

Figure 17:
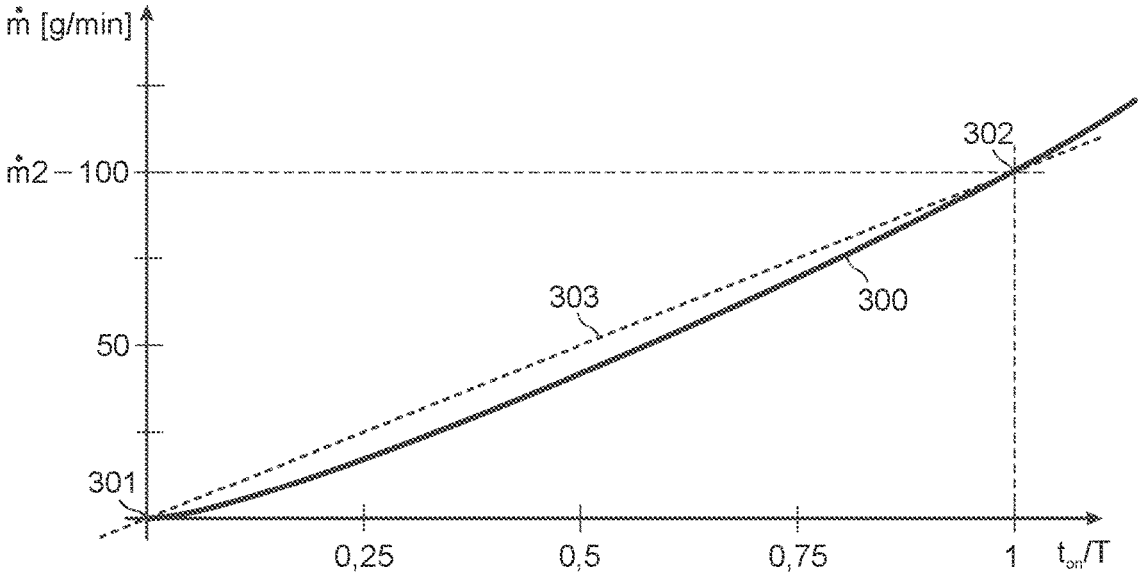
FIG. 17 shows, in an exemplary manner, the course of the coating powder mass flow rate as a function of the opening duration of the outlet valve for the coating device according to FIG. 4.

In the case of the coating device according to FIGS. 4 and 8, the height of the coating powder mass flow rate ṁ is set via the opening period of the locking element (outlet valve) 4. FIG. 17 the curve progression 300 of the coating powder mass flow rate ṁ in an exemplary manner as a function of the opening period $T_{on}/T$ of the outlet valve 4. As can be gathered from the curve progression 300, the powder already starts to flow in the powder line 9, 10 in response to a minimal opening duration $t_{on}/T$ (point 301). Due to the fact that the time period Δt as well as the powder mass m transported during this time period and the corresponding opening period $t_{on}/T$ (=1) is known due to the calibration (see calibration process), a straight line 303 can be calculated, which goes through the points 301 and 302 and which reflects the actual course of the curve 300 in a well-approximated manner.

Figure 18:
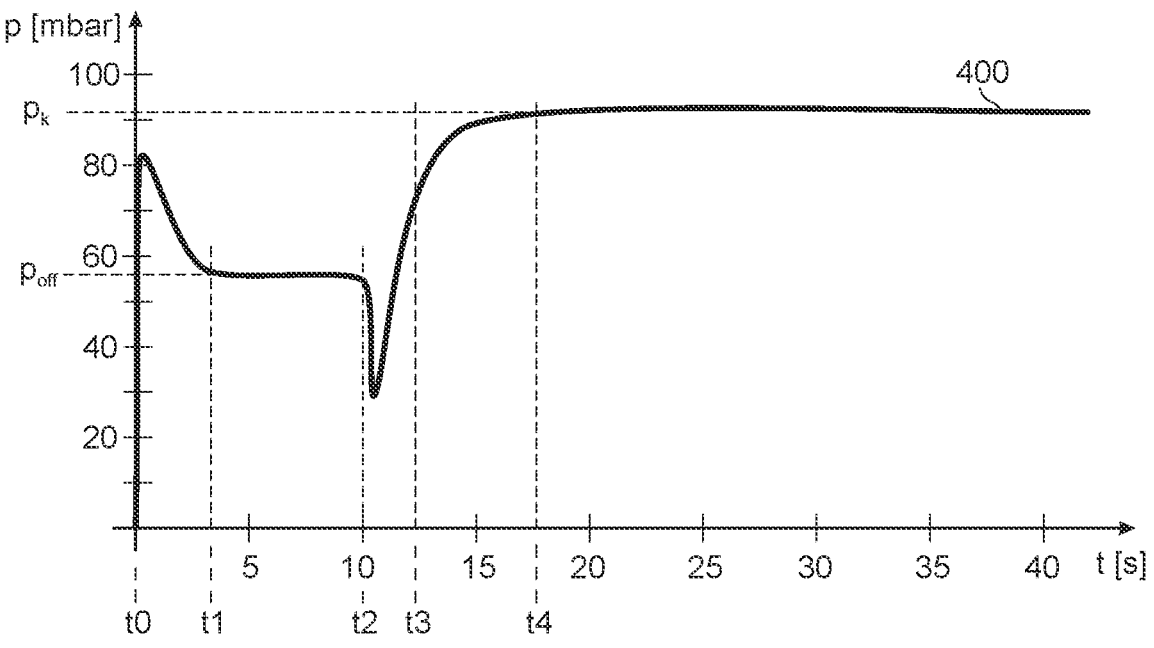
FIG. 18 shows the pressure profile as a function of the time in response to different events.

FIG. 18 shows the curve progression 400 of a pressure signal S in the powder line 9, 10 as a function of the time t in response to different events in an exemplary manner. When the spray applicator 3 is not moved or moved only slightly, the pressure sensor 2 generates a relatively constant pressure signal S. In the curve progression 400, this can be seen to the right of the point in time t4. When, in contrast, the spray applicator 3 is moved, a sinusoidal wave is superimposed on the fundamental signal. The more powder is conveyed, the more powder attaches to the walls of the powder line 9, 10. If a certain flow rate is exceeded, a portion of the powder can suddenly detach from the walls during the coating, which is then transported to the spray applicator 3 in a surge (so-called dune conveyance within the hose). This, in turn, can lead to unwanted spitting in the powder cloud generated by the spray applicator 3, which generally reduces the quality of the coating. Such an event is reflected in the sensor signal S and can be detected by means of the control and evaluation unit 15. When the controller 15 has detected such an event in the sensor signal S, it can output a corresponding information to the operating personnel or automatically adapt the operating parameters The degree of contamination of the powder line 9, 10 can also be determined from the curve of the signals. When only compressed gas is applied to the powder line 9, 10 (the powder supply in the powder line 8 is interrupted), the pressure at the point in time t0 reaches a peak value, then drops and reaches a stable level at the point in time t1 (after approx. 3 s). This pressure signal curve suggests that the powder line 9, 10 is gradually freed from the powder. After the pressure signal has assumed a constant value $p_{off}$ after t1 (section t1 to t2), it is to be assumed that the powder was blown out of the powder line 9, 10. A constant state is reached at the point in time t4 in the subsequent coating phase, which starts at the point in time t3=12 s. The longer the powder line 9, 10, the longer the signal increase lasts (between t3 and t4). The control and evaluation unit 15 can thus, for example, also determine the length of the powder line 9, 10 from the sensor signal S.

To be able to carry out the determination of the pressure offset value $p_{off}$ even more exactly, it is helpful to carry out the measurement when the powder line 9, 10 has a certain powder residue.

The powder line 9, 10 can be, for example, a powder hose.

Figure 19:
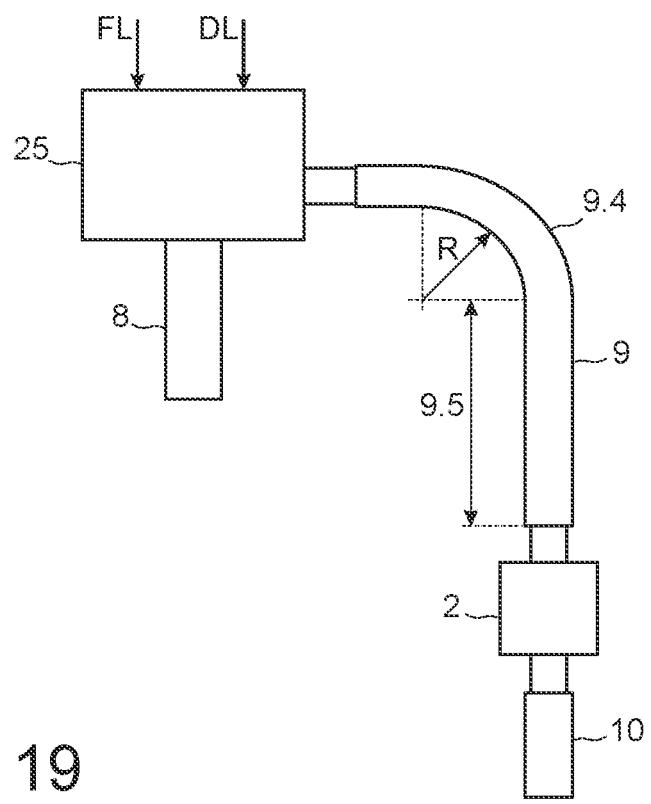
FIG. 19 shows an advantageous hose routing.

The length of the powder line 9 as well as the type of the installation thereof can also play a role (FIG. 19). Even though the number and shape of the bends and the radii R thereof generally do not have any impact on the offset pressure $p_{off}$, they can in fact have an impact on the actual differential pressure. The reason for this is that the powder particles collide with the hose wall in the case of each bend and initially lose speed. However, the particles are subsequently accelerated again by means of the gas flow. The energy required for this purpose causes an increase of the back pressure, which was not considered during the determination of the offset pressure $p_{off}$. In the case of the definition provided previously, this factor becomes smaller, the more bends are present.

On principle, it is advantageous to select the radii R of the hose bends to be as large as possible and to avoid kinks. In addition, it is advantageous to provide a calming section 9.5 in the powder line 9, 10.

It can be provided that, for example, when starting up the coating system, additional parameters are transferred to the controller 15 via the powder line 9, 10 or the powder lines, respectively. The length of the powder hose 9, 10 and, for example, also the number of the curves and the radii R thereof, can thus be transferred to the controller 15 for each spray applicator 3. The average height, at which the powder line 9, 10 is arranged, can also be transferred to the controller 15. The controller 15 can then calculate, for example, a routing factor VF by means of such additional information.

The above-described methods are not limited to the above-described conveying devices and coating devices. The above-described methods can thus, for example, likewise also be used in the case of the conveying devices described in the publications DE 10 2017 103 316 A1, DE 10 2018 133 713 A1, WO 2009/037540 A2, DE 10 2005 006 522 B3, EP 2 77 821 A1, WO 2003/024612 A1, DE 102 47 829 A1, WO 2005/051549 A1, EP 3 238 832 A1, DE 103 00 280 A1, DE 103 53 968 A1, WO 2014/161718 A1 and WO 2014/202342 A1 for measuring the powder mass flow rate. The above-described measuring devices can likewise be used in the case of the previously mentioned conveying devices. The same applies analogously for the plug conveying systems PP25 and PP40 by the J. Wagner GmbH, 88677 Markdorf, which are described in their usual manual, edition 11/2020, order number DOC2368103.

The preceding description of the exemplary embodiments according to the present invention serves only for illustrative purposes. As part of the invention, various changes and modifications to the measuring device and the conveying device are possible. For example, the various components of the coating devices shown in FIGS. 1 to 4, 7 to 15 and 19 can thus also be combined with one another in a different way than in the way shown in the figures.

LIST OF REFERENCE NUMERALS 1 powder conveyor
1.1 powder inlet of the conveyor
1.2 powder outlet of the conveyor
2 pressure sensor
3 spray applicator
4 locking element
6 powder storage container
7 powder supply line
8 powder line
9 powder line
9.1 downstream end of the powder line
9.2 opening
9.4 bend
9.5 calming section
10 powder line
10.1 first end of the powder line
10.2 second end of the powder line
11 locking element/valve
13 compressed gas source
14 locking element/valve
15 control and evaluation unit
16 setting means
17 operating personnel/display
18 controllable compressed gas source 18
19 powder sensor
20 coating powder 21 dividing wall
22 valve
23 valve
24 valve
25 injector
25.1 drive nozzle
25.2 collector nozzle
25.3 conveying gas connection
25.4 metering gas connection
25.5 metering gas channel
25.6 intake channel
25.7 guide sleeve
26 pressure controller
27 pressure transducer
28 orifice
29 compressed gas source
30 pressure control valve
31 pressure control valve
32 pressure sensor line
33 sensor coupling
33.1 powder inlet
33.2 sensor connection
33.3 powder outlet
33:1-33:9 first to ninth sensor coupling
34 rail
40 compressed gas source
41 locking element
45 compressed gas source
46 locking element/valve
51 working container
51.2 vent connection
51.3 cleaning connection
52 intermediate container
52.1 connection on the intermediate container
52.2 powder outlet of the intermediate container
55 spray applicator
56 coating booth
57 cyclone separator
58 afterfilter
59 ultrasonic screen
61 valve
62 vent valve
64 valve
65 valve
66 valve
67 inlet for transport gas
69 fluidizing means
70 vibrating device
71 valve for fresh powder
72 valve
73 valve
74 valve
75 vacuum valve or negative pressure generator
76 valve
77 valve for fresh powder
78.1 pressure sensor
79 sensor
80 storage container
81 pump
84 pressure control valve
90 line
91 line
92 line
93 line
94 line
95 line
96 line

97 line
98 powder inlet
99.1-99.*n* powder outlets
100 powder conveying device
103 mouthpiece
110 workpiece
121 valve
122 valve
123 pump
132 transport gas channel
133 hose stem
194 ring gap
196 outlet body
196.2 powder channel
200 powder conveying curve
201 start of conveying
202 calibration point
203 straight line
211 measuring electrode
213 sensor connection/measuring signal connection
214 sleeve
215 sensor electronics
240 electrical connection
250 compressed air control connection for the valve 4
300 powder conveying curve
301 calibration point
302 calibration point
303 straight line
400 powder conveying curve
501-510 steps
601-604 steps
DL metering gas
DRL compressed gas
FL conveying gas
FdL fluidizing gas
FP fresh powder
k correction value
m powder mass
ṁ coating powder mass flow rate
P particles
PS powder flow
p pressure
$p_k$ pressure value for the calibration
$p_{off}$ offset pressure
RP recycled powder
S sensor signal
S2 sensor signal
SL flushing gas
t0 point in time
t1 point in time
t2 point in time
t3 point in time
t4 point in time
TL transport gas
t time
ton turn-on duration
T period duration
Δt time period
V̇ compressed gas volume flow rate
V̇1 compressed gas volume flow rate
V̇2 compressed gas volume flow rate
α angle

The invention claimed is:

1. A measuring device for measuring a coating powder mass flow rate that can be generated by means of compressed gas in a powder line, comprising a control and evaluation unit, which is formed and can be operated in such a way that it can change between an offset mode and an operating mode,
wherein the control and evaluation unit in the offset mode ensures
that a setting means applies compressed gas to the powder line and prevents the coating powder flow in the powder line,
a pressure sensor then detects the pressure in the powder line and
the control and evaluation unit interprets the detected pressure as offset pressure value, and
wherein the control and evaluation unit, in the operating mode, ensures
that the setting means releases the coating powder flow in the powder line, and
then determines the coating powder mass flow rate flowing through the powder line on the basis of the pressure detected by the pressure sensor in the powder line, the offset pressure value and a correction value.

2. The measuring device according to claim 1,
wherein the setting means comprises a controllable compressed gas source.

3. The measuring device according to claim 1,
wherein the setting means comprises a locking element.

4. The measuring device according to claim 1,
wherein the control and evaluation unit is formed and can be operated in such a way that it repeatedly changes into the offset mode and determines the offset pressure value anew.

5. The measuring device according to claim 1,
wherein the control and evaluation unit is formed and can be operated in such a way that it determines the coating powder mass flow rate anew.

6. The measuring device according to claim 1,
wherein the control and evaluation unit is formed and can be operated in such a way that it can change into a calibrating mode, and in the calibrating mode ensures that
the setting means releases the coating powder flow in the powder line for a certain time period,
the pressure sensor then meanwhile detects the pressure in the powder line, and
the control and evaluation unit interprets the detected pressure as pressure value, and
the control and evaluation unit determines the correction value on the basis of the coating powder mass, which has flown through the powder line during this time period, and the two pressure values.

7. The measuring device according to claim 6,
wherein the control and evaluation unit is formed and can be operated in such a way that it repeatedly changes into the calibrating mode and determines the correction value anew.

8. The measuring device according to claim 6,
wherein the control and evaluation unit is formed and can be operated in such a way that it, when the correction value determined anew deviates from the previous correction value, adapts it and/or signals the deviation.

9. The measuring device according to claim 1,
comprising a powder sensor, in order to detect whether coating powder flows through the powder line.

10. The measuring device according to claim 9,
wherein the powder sensor is arranged in a spray applicator, which is connected to the powder line.

11. The measuring device according to claim 10,
wherein the powder sensor is formed as influence sensor or as optical sensor.

12. The measuring device according to claim 1,
wherein the control and evaluation unit is formed and can be operated in such a way that it calculates a smoothed pressure value from several pressure values detected by the pressure sensor.

13. A conveying device for coating powder comprising a measuring device according to claim 1,
comprising a powder conveyor, which can be operated with compressed gas and which is connected to the powder line on the outlet side, and
wherein the coating powder flow in the powder line can be prevented by means of the setting means.

14. The conveying device according to claim 13,
wherein the powder line is connected to a spray applicator on the outlet side.

15. The conveying device according to claim 14,
wherein the compressed gas source has a compressed gas locking element.

16. The conveying device according to claim 13,
wherein the compressed gas source has a volume flow controller, which is provided to keep the compressed gas volume flow supplied to the powder conveyor at a predeterminable, constant value.

17. The conveying device according to claim 13,
wherein the powder conveyor has an injector.

18. The conveying device according to claim 13,
in the case of which wherein the powder conveyor has a working container, which can be pressurized, comprising a powder inlet and a powder outlet, wherein the powder outlet is connected to the locking element, and
wherein the powder line has an inlet for transport gas on the inlet side.

19. The conveying device according to claim 13,
wherein the control and evaluation unit is formed and can be operated in such a way that it controls the compressed gas source so that a certain coating powder mass flow rate is reached.

20. A method for measuring the coating powder mass flow rate by means of a measuring device according to claim 1, which comprises the following steps:
the control and evaluation unit is brought into the offset mode,
compressed gas is applied to the powder line by means of the setting means and the coating powder flow in the powder line is prevented,
the pressure in the powder line is detected by means of the pressure sensor and is interpreted as offset pressure value,
the control and evaluation unit is brought into the operating mode,
the coating powder flow in the powder line is released with the help of the setting means,
the pressure in the powder line is detected by means of the pressure sensor, and
the control and evaluation unit determines the coating powder mass flow rate flowing through the powder line with the help of the detected pressure, the offset pressure value and the correction value.

* * * * *